(12) United States Patent
Carmannini et al.

(10) Patent No.: US 6,718,110 B2
(45) Date of Patent: Apr. 6, 2004

(54) INDIFFUSED OPTICAL WAVEGUIDE STRUCTURES IN A SUBSTRATE

(75) Inventors: Carlo Carmannini, Arcene (IT); Steffen Schmid, Milan (IT)

(73) Assignee: Corning Incorporated, Corning, NY (US)

( * ) Notice: Subject to any disclaimer, the term of this patent is extended or adjusted under 35 U.S.C. 154(b) by 181 days.

(21) Appl. No.: 09/878,414

(22) Filed: Jun. 12, 2001

(65) Prior Publication Data

US 2001/0046343 A1 Nov. 29, 2001

Related U.S. Application Data

(62) Division of application No. 09/324,769, filed on Jun. 3, 1999, now abandoned.
(60) Provisional application No. 60/091,473, filed on Jun. 29, 1998.

(30) Foreign Application Priority Data

Jun. 4, 1998 (EP) .............................. 98110178

(51) Int. Cl.[7] .............................. G02B 6/10; B44C 1/22
(52) U.S. Cl. ....................... 385/132; 385/129; 216/24; 216/37
(58) Field of Search ............................ 385/129, 132; 216/24, 37, 44, 67

(56) References Cited

U.S. PATENT DOCUMENTS

| | | | |
|---|---|---|---|
| 3,850,503 A | 11/1974 | Riseberg et al. .............. 385/41 |
| 4,284,663 A | * 8/1981 | Carruthers et al. .......... 427/160 |
| 4,376,138 A | * 3/1983 | Alferness et al. ........... 427/160 |
| 4,851,079 A | 7/1989 | Booth et al. .................. 216/24 |
| 4,906,063 A | 3/1990 | Sato et al. ...................... 385/7 |
| 5,119,447 A | 6/1992 | Trisno ............................ 385/3 |
| 5,168,542 A | 12/1992 | Chakravorty et al. ....... 385/132 |
| 5,227,011 A | 7/1993 | Enomoto et al. .............. 216/66 |
| 5,378,309 A | 1/1995 | Rabinzohn ................... 438/695 |
| 5,452,314 A | 9/1995 | Aronson ....................... 372/20 |
| 5,609,775 A | 3/1997 | Liu ............................. 438/625 |
| 6,167,169 A | * 12/2000 | Brinkman et al. .............. 385/4 |
| 6,282,332 B1 | * 8/2001 | Bosso et al. .................... 385/7 |

FOREIGN PATENT DOCUMENTS

| | | | |
|---|---|---|---|
| DE | 44 33 844 A 1 | 9/1994 | ........... G02B/1/125 |
| EP | 0 737 880 A1 | 10/1996 | ........... G02F/1/125 |
| EP | 0 784 362 A1 | 7/1997 | ............. H01S/3/06 |
| GB | 2026922 | 2/1980 | ........... H01L/1/306 |
| GB | 2 304 917 | 3/1997 | ........... G02F/1/125 |
| JP | 58211106 A1 | * 12/1983 | ........... G02B/5/172 |

(List continued on next page.)

OTHER PUBLICATIONS

Patent Abstracts of Japan, Publication No. 07027941, Publication date Jan. 31, 1995.

(List continued on next page.)

*Primary Examiner*—Brian Healy
*Assistant Examiner*—Kevin S Wood
(74) *Attorney, Agent, or Firm*—Juliana Agon

(57) ABSTRACT

The invention relates to a method of manufacturing an indiffused optical waveguide (6) in a substrate (1). A metal layer (7) and photoresist (8) are deposited on a substrate (1) in this order. Portions of the photoresist (8) are removed such that a photoresist structure (8) corresponding to the desired waveguide structure is left. The exposed portions of the metal layer (7) are removed by a chemical/physical etching technique whereafter the remaining photoresist (8) is removed and the remaining metal layer (7) is diffused into the substrate (1) by a heat treatment. The usage of a chemical/physical etching method for removing portions of the metal layer (7) results in smaller variations in the width of the waveguide after indiffusion. Such waveguides are particularly advantageous when being used in connection with acousto-optical devices. The optical waveguides according to the invention are also useable with other integrated optics devices.

16 Claims, 17 Drawing Sheets

FOREIGN PATENT DOCUMENTS

| JP | 61198106 A1 * | 9/1986 | ............ G02B/6/12 |
| JP | 5-326517 | 12/1993 | ............ H01L/21/28 |
| JP | 06174908 A1 * | 6/1994 | ............ G02B/5/18 |
| JP | 07027941 A1 * | 1/1995 | ............ G02B/6/13 |
| WO | 89/10534 | 11/1989 | ............ G01B/9/02 |

OTHER PUBLICATIONS

Patent Abstracts of Japan, Publication No. 06174908, Publication date Jun. 24, 1994.

European Search Report dated Sep. 16, 1999.

European Search Report dated Sep. 22, 1999.

Patent Abstracts of Japan, Publication No. 59033431, Publication date Feb. 23, 1984.

Aronson et al., "Acoustic Pulse Measurements of Acousto–Optic Tunable Filter Properties," Hewlett Packard Laboratories, IPR19S, Dana Point, post–deadline paper #6–2.

D.A. Smith, et al., Source of Sidelobe Asymmetry in Integrated Acousto–Optic Filters, Appl. Phys. Lett., vol. 52, pp. 814–816 (1993).

S. Schmid, et al., "Full Wafer Scale Fabrication of Acousto–Optic 2×2 Wavelength Selective Space Switches on LiNbO$_3$," ECIO'95 Proceedings 7$^{th}$ European Conference on Integrated Optice, Apr. 3–6, 1995, pp. 21–34.

H. Herrmann, et al., "Tapered Acoustical Directional Couplers for Integrated Acousto–Optical Mode Converters with Weighted Coupling," Journal of Lightwave Technology, vol. 13, No. 3, pp. 364–374, Mar. 1995.

Morasca, et al., "Application of LiNbO$_3$ Acousto Optic Tunable Switches and Filters in WDM Transmission Networks at High Bit Rates," published in Giancarlo Prati (Ed.): "Photonics Networks", pp. 458–472, Springer 1997.

"Guided–Wave Optoeletronics," Theodor Tamir (Ed.), Springer 1990, pp. 146–149.

Fiber Optic Communications Handbook, Second Edition, pp. 390–394.

European Search Report dated Nov. 6, 1998.

2.1 Optische Wellenleiter, Herstellung Optischer Wellenleiter, Kapitel 2. Der Polarisationsteiler, pp. 8–10.

Neyer, "Low–crosstalk Passive Polirization Splitters Using TnLiNbO$_3$ Waveguide Crossings," Appl. Phys. Lett. 55(10), Sep. 4, 1989, pp. 927–929.

Levi, et al., "External Modulations System for AM Fiber CATV Transport," A paper presented at Fiber Optics Plus '92, Jan. 8–9, 1992.

European Search Report dated Nov. 12, 1998.

Patent Abstracts of Japan, Publication No. 61198106, Publication Date Sep. 2, 1986.

Patent Abstracts of Japan, Publication No. 58211106, Publication Date Dec. 8, 1983.

\* cited by examiner

WAVEGUIDES IN INTEGRATED OPTICAL TECHNOLOGY

FIG. 2 CONCEPTIONAL DIAGRAMS OF SOME INTEGRATED OPTICAL COMPONENTS

BASIC MODE CONVERTER DESIGN

ACOUSTO OPTIC TUNABLE 2×2 WAVELENGTH SPACE SWITCH

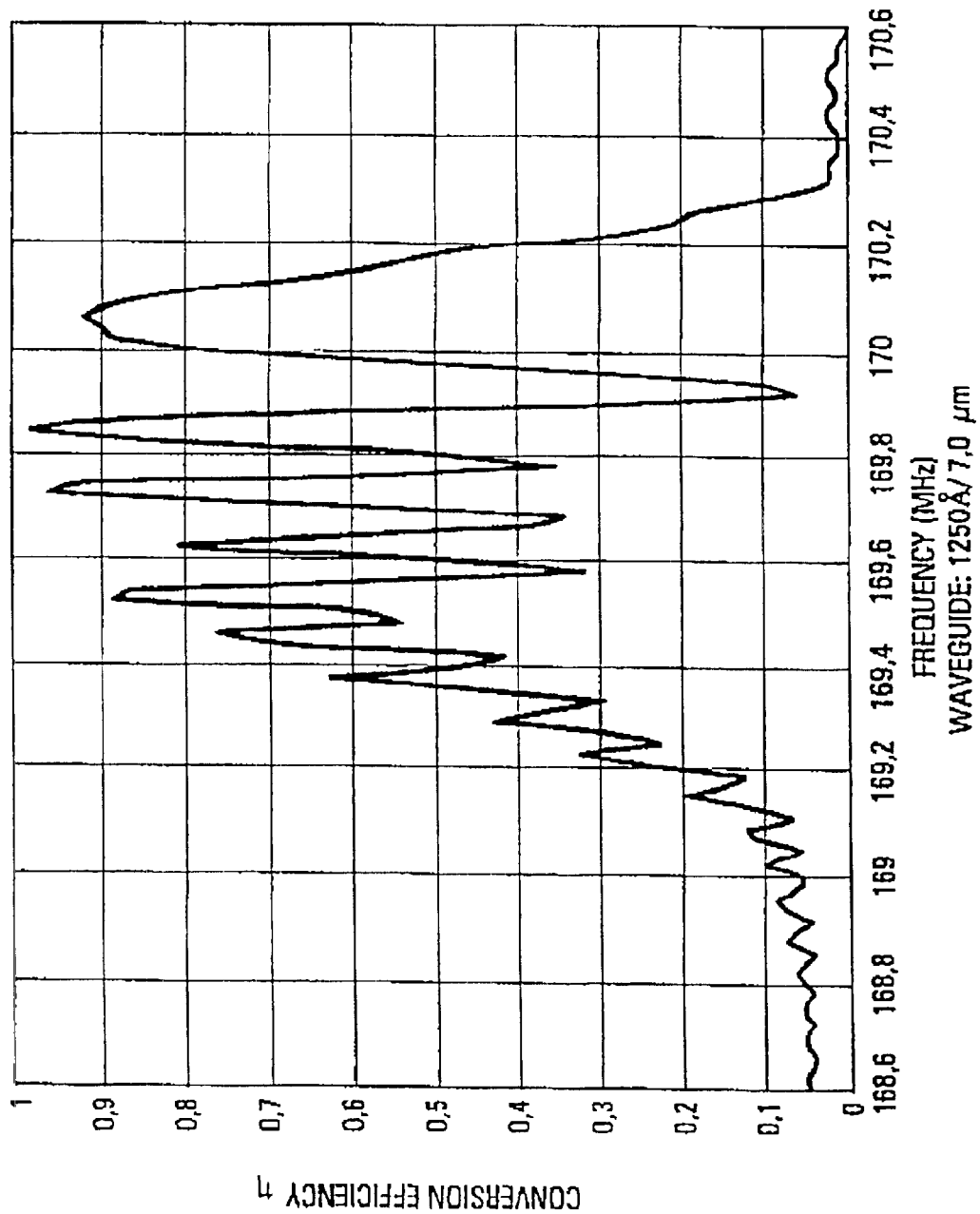

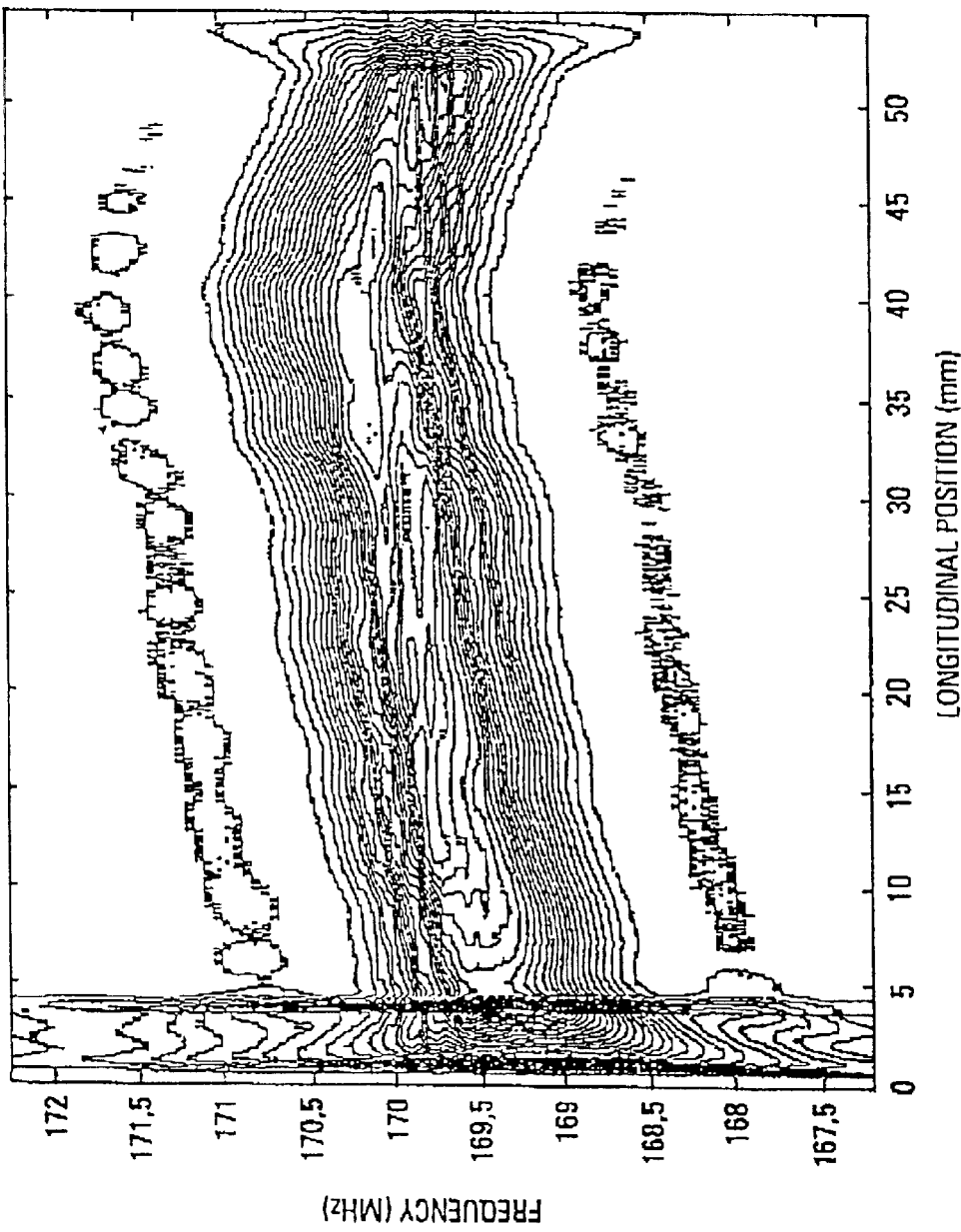
FIG. 5 CONTOUR PLOT OF THE PHASE MATCHING FREQUENCY ALONG THE ACOUSTO-OPTIC MODE CONVERTER (WAVEGUIDE: 1250 Å / 7 μm)
PULSE PROBING

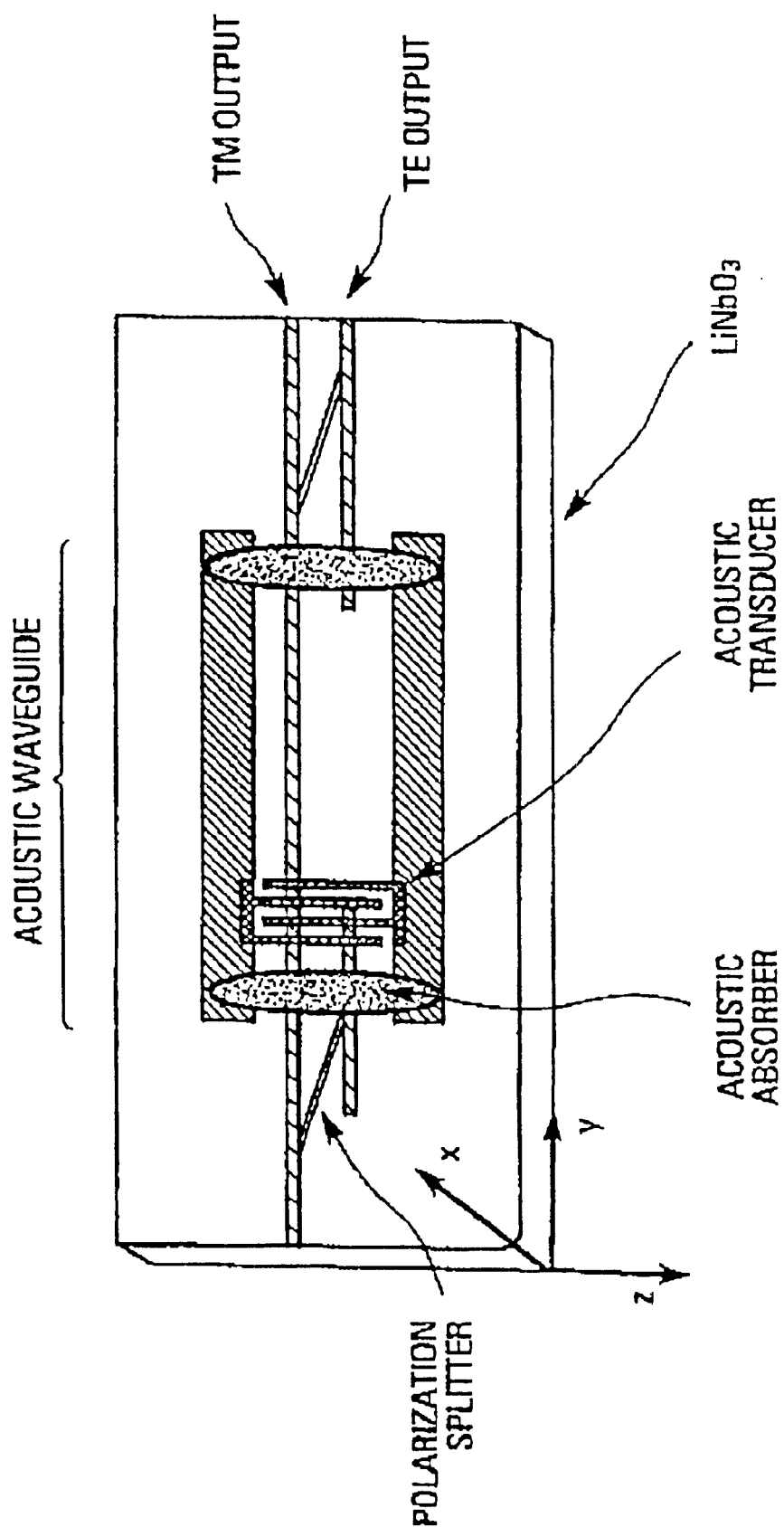
FIG.7 ACOUSTO-OPTICAL FILTER

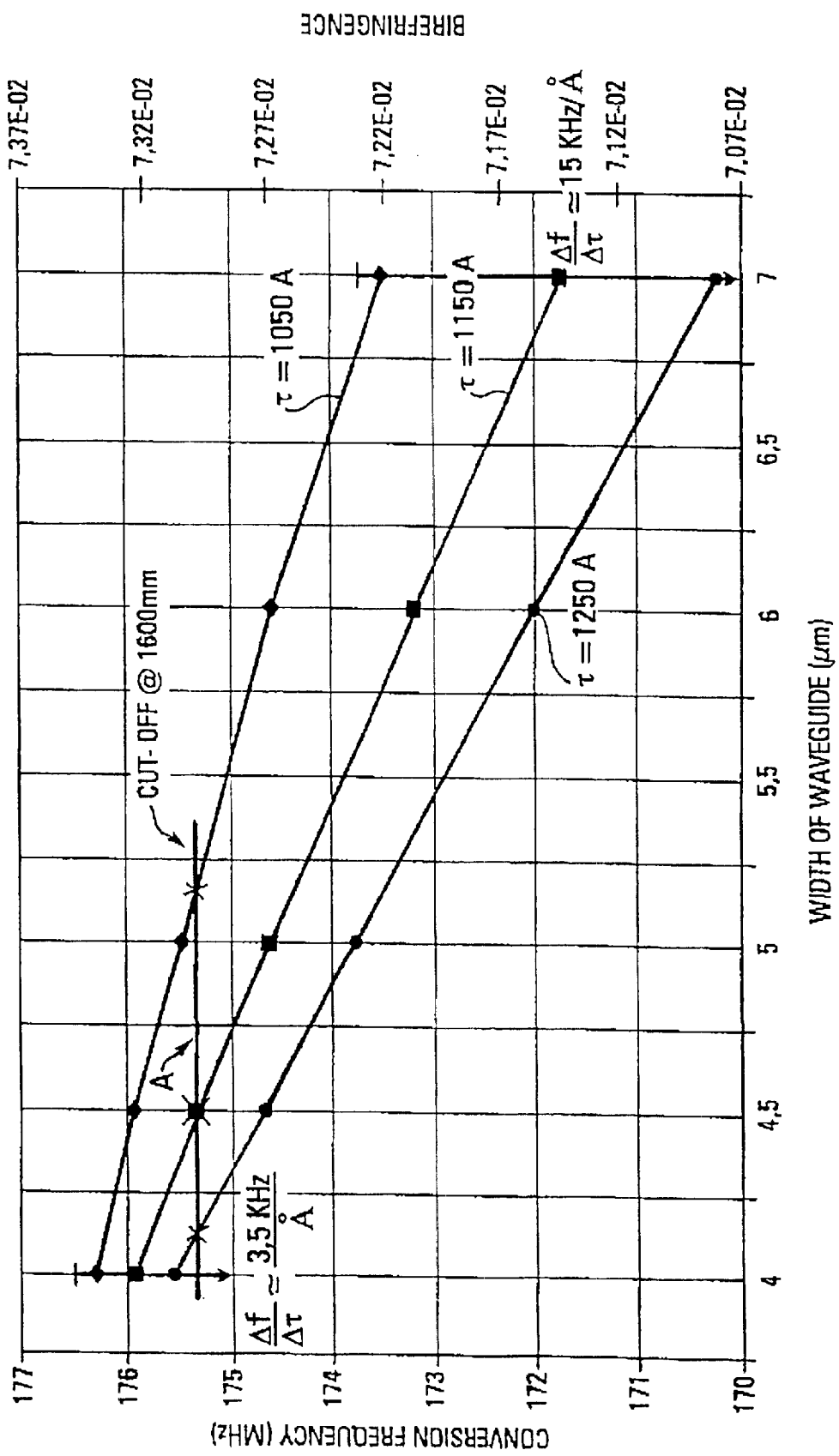

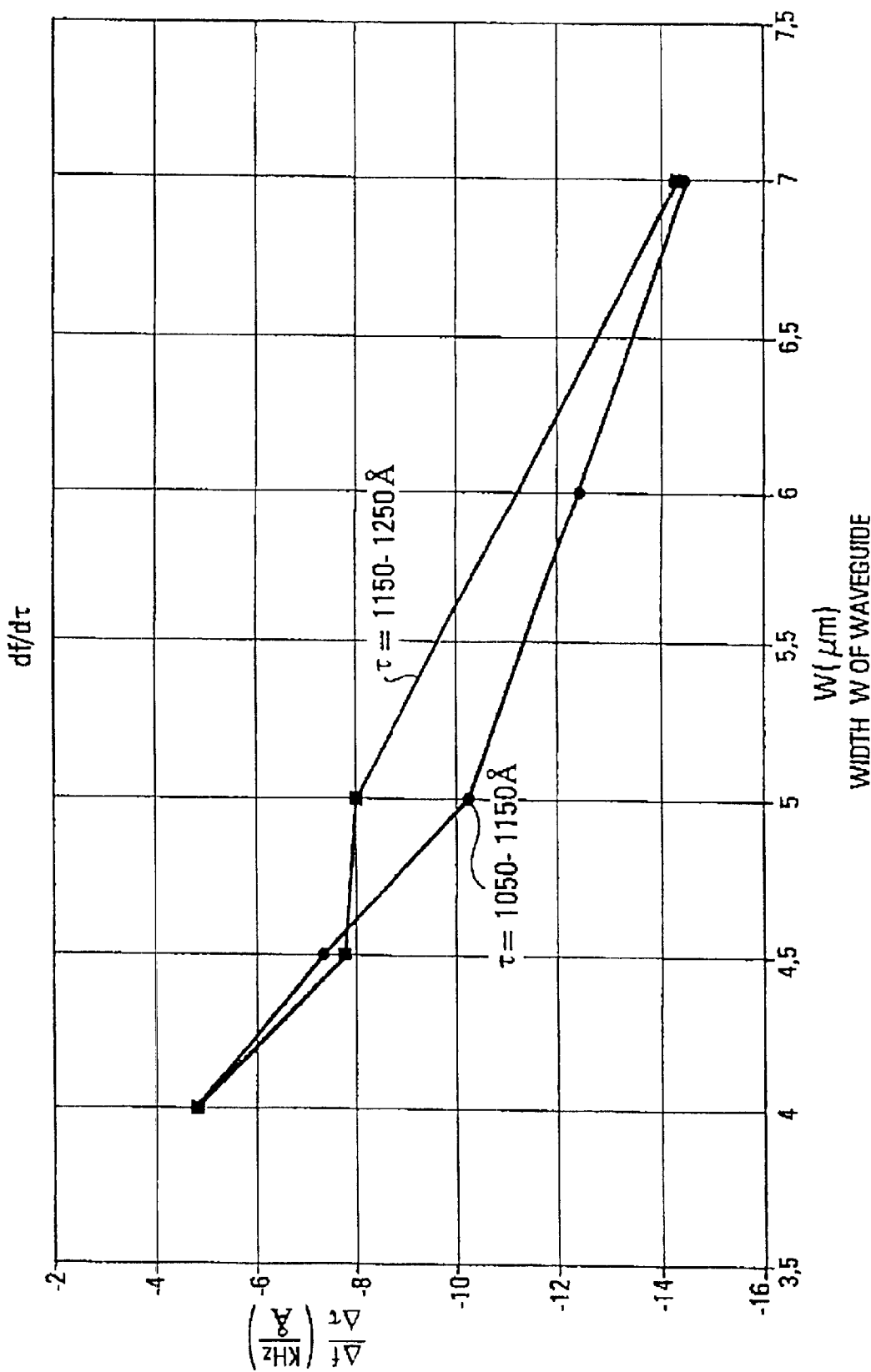

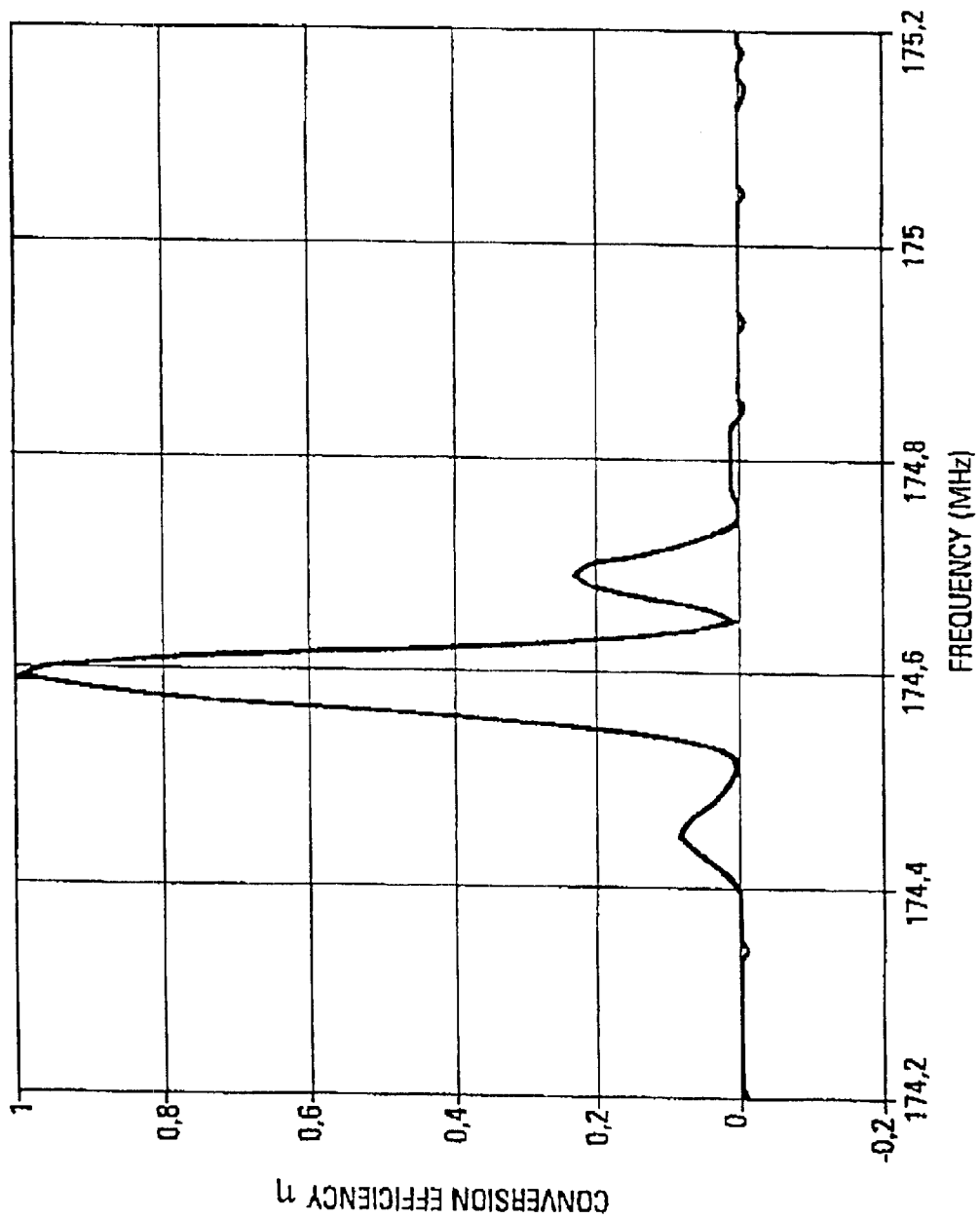
FIG.10a CONVERSION CURVE (1050 Å / 4,5 μm)

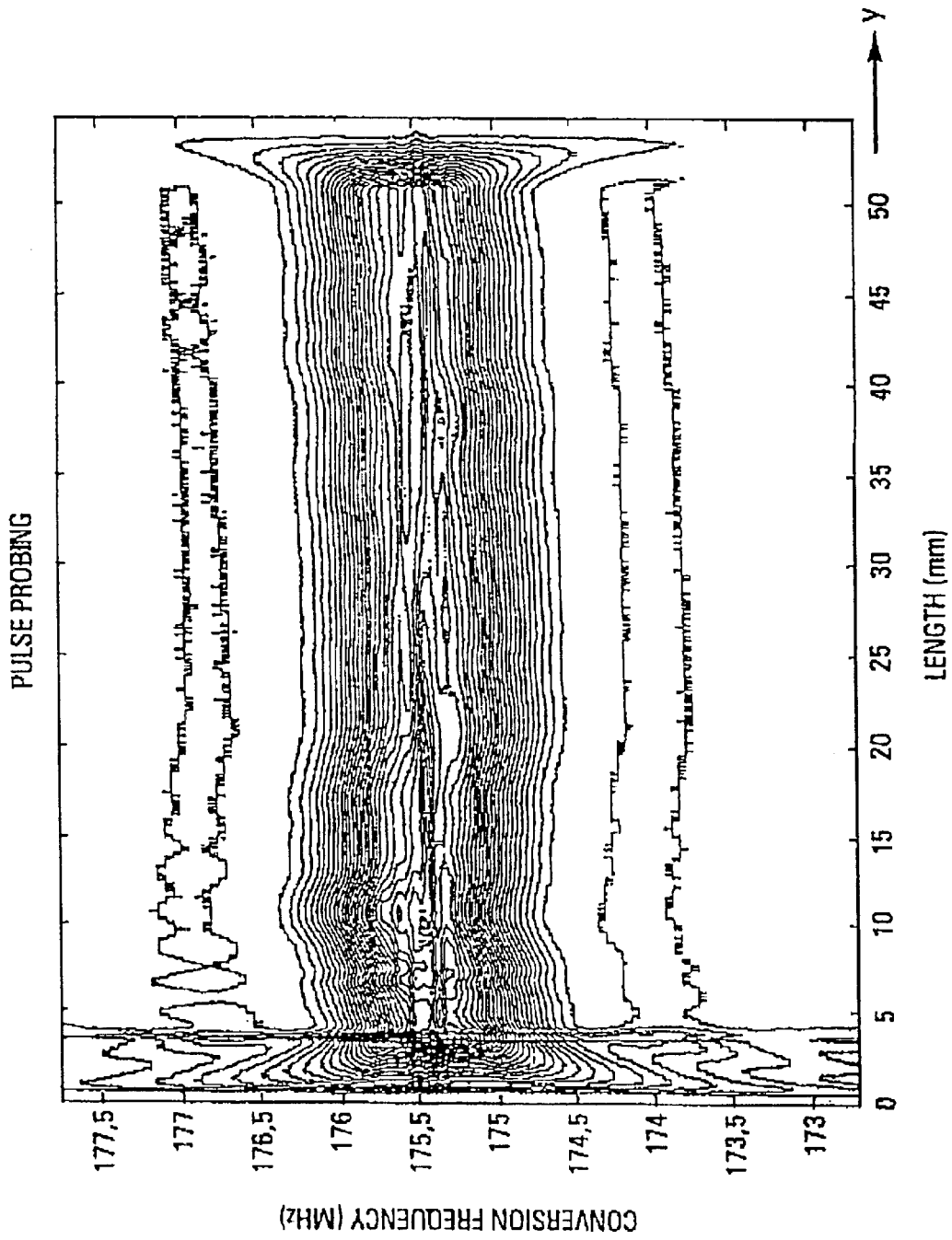
FIG. 10b VARIATION OF THE PHASE MATCHING FREQUENCY 1050 Å / 4.5 μm

POSITION OF THE SAMPLES ON THE WAFER

| | METHOD | Ti-THICKNESS | MODE DIAMETER | SPLITTING RATIO P1/P2 AVERAGE | STAND.DEVIATION % | MAX. VAR.% |
|---|---|---|---|---|---|---|
| DP0 | Lift-off | 1223 | 10.1 | 0.469957496 | 5.700456272 | 15.46323501 |
| DP1 | Lift-off | 1201 | 9.9 | 0.350913659 | 6.25639344 | 18.22717032 |
| DP3 | Lift-off | 1187 | 10.7 | 0.108150849 | 5.191760671 | 14.76594578 |
| DP5 | Lift-off | 1213 | 11.0 | 0.119602514 | 20.73418796 | 49.01148026 |
| DP6 | Lift-off | 1244 | 10.3 | 0.210367869 | 8.219938334 | 24.32541974 |
| DP7 | Lift-off | 1261 | 9.9 | 0.540754028 | 23.8332887 | 66.54339075 |
| DP8 | Lift-off | 1322 | 9.8 | 0.775146278 | 4.85664959 | 13.68696574 |
| DP10 | Lift-off | 1351 | 9.9 | 0.831680526 | 7.256300373 | 18.755550895 |
| DP11 | Lift-off | 1339 | 9.9 | 0.306666667 | 12.61934121 | 35.38306452 |
| | | | | | 10.51870184 | |
| DP12 | Rie | 930 | 9.8 | 1.398353382 | 3.692824523 | 11.10140679 |
| DP13 | Rie | 1026 | 9.1 | 2.606179817 | 4.044676214 | 11.44408435 |
| DP14 | Rie | 1132 | 8.7 | 4.930752506 | 3.454577142 | 10.44136315 |
| | | | | | 3.730692627 | |

INDIFFUSED OPTICAL WAVEGUIDE STRUCTURES IN A SUBSTRATE

This is a division of application Ser. No. 09/324,769, filed Jun. 3, 1999 now abandoned, and claims the benefit of U.S. provisional application No. 60/091,473, filed Jun. 29, 1998, both of which are incorporated herein by reference. This application also claims priority under 35 U.S.C. §119 of application Serial No. 98 110 178.5, filed on Jun. 4, 1998 in the EPO, which is also incorporated herein by reference.

FIELD OF THE INVENTION

The invention relates to a method of manufacturing an indiffused optical waveguide structure in a substrate, Furthermore, the invention relates to an indiffused optical waveguide manufactured by such a method and to various integrated optics devices using such indiffused waveguide structures. Such integrated optic devices may be for example an acousto-optical mode converter, an accusto-optical switch, an optical power splitter, a dual-output Mach-Zehnder modulator, a polarisation splitter and an electro-optical switch. In particular the invention relates to making an indiffused optical waveguide in birefringent substrate materials like $LiNbO_3$. In such a birefringment substrate the refractive index neff, TE, TM for the quasi TE and quasi TM-modes in the waveguides will respectively have slightly different values with respect to the substrate index.

The manufacturing method and the waveguide structures according to the invention are superior to previously known waveguide structures in that they can be manufactured with higher dimensional precisions, for example, in order to keep the variations of the birefringence along the optical waveguides as small as possible resulting in an overall improved performance of integrated optic devices using such waveguide structures.

BACKGROUND OF THE INVENTION

FIG. 1 shows several optical waveguide structures applied to integrated optic devices, for example a raised stripe waveguide (FIG. 1b), a rib waveguide or optical stripe-line (FIG. 1c), a general channel waveguide (FIG. 1d) or a ridge waveguide (FIG. 1e).

Many integrated optics devices use the so-called diffused or embedded waveguide as shown in FIG. 1a.

Furthermore, the optical waveguide structures are not limited to any particular longitudinal geometry, i.e. any kind of straight or curved geometry as used in Y-junctions, polarising beam splatters etc. can be used. FIG. 2 shows examples of such basic structures: FIG. 2a: Y-junction, FIG. 2b: WDM.-device; FIG. 2c: star coupler and FIG. 2d: polarising beam coupler.

Furthermore, the optical waveguide and substrate materials are not limited to any particular material, That is, generally the materials can comprise isotropic, anisotropic and birefringent materials. In particular, the usage of a birefringent substrate is essential for the manufacturing of acousto-optical devices. For example, the diffused channel waveguide of FIG. 1a can comprise a substrate material of $LiNbO_3$ with a waveguide made by a titanium indiffusion.

Whilst theoretically the geometry of the waveguide within the substrate is determined on the basis of known diffusion profiles, due to the fabrication conditions such a theoretically calculated diffusion profile or waveguide geometry is never reached in practice. Furthermore, there is no easy means to measure the actual distribution of the waveguide cross section. Therefore, the operator performs numerous experiments to find out the manufacturing conditions such that the produced integrated optics device has a performance that fulfils the theoretically calculated requirements.

Therefore, due to the imperfections during the fabrication processes used for making the waveguides in FIG. 1 (for example disuniformities in the titanium stripe dimensions, temperature gradients during diffusion, etc.) the effective waveguide birefringence varies locally over the wafer used for making a plurality of such devices at the same time and also as an averaged value from wafer to wafer. The applicant has found that the performance of single optical components (e.g. straight and curved waveguides) as well as more complex integrated optical devices, like an acousto-optical mode converter depends critically on the uniformity of the waveguide birefringence. Thus, the overall performance and reproducibility of acoustooptical devices strongly depends on the homogeneity and reproducibility of the fabrication processes.

Birefringence essentially means that the effective index (or the propagation constant) for (quasi) TE-modes and TM-modes is different and therefore the requirement of a small variation of birefringence means that the difference in propagation constants or the difference in refractive index An remains the same along the optical waveguide as much as possible. There is no known relationship between the extent of such a birefringence variation and the fabrication parameters and thus it is unpredictable how large such variations are.

The birefringence variations can have detrimental effects even in simple single waveguides. In integrated optics and also in distributed optical communication systems it is often desirable to switch the input polarisation of a TE-mode to the TM-polarisation and this can, for example, be performed by electro-optical couplers or by an acousto-optical mode converter. The latter device is based on the usage of a birefringent optical waveguide and if this waveguide has birefringent variations this will cause the performance of this device to deteriorate drastically.

Birefringence Variation in Acousto-Optic Devices

The detrimental effects of birefringent variation in the basic acousto-optical mode converter are explained with reference to FIG. 3. The working principle of an integrated acousto-optical device e.g, on $LiNbO_3$ is based on a wavelength selective polarisation conversion between two copropagating optical waves polarised along the main birefringence axes of the $LiNbO_3$-crystal i.e. between the "TM"- and "TE"-modes, Energy can be exchanged between these orthogonal polarisation modes when they get coupled by the off-diagonal elements in the dielectric tensor. This is possible for example by the electro-optic or photo-elastic effect as explained below. A surface acoustic wave, i.e. an elastic "Rayleigh-wave" in a photoelastic and piezoelectric material such as in $LiNbO_3$ is an ideal means of coupling due to its tunability in frequency and in power.

As shown in FIG. 3 a straight monomodal waveguide of conventionally for example 7 $\mu$m is embedded in about a 100 $\mu$mm wide monomodal acoustic-waveguide (x-cut, y-propagating $LiNbO_3$-crystal). Both optical waveguides and acoustic claddings are fabricated by a titanium indiffusion. Metalinterdigital transducers of a suitable configuration are deposited on top of the crystal at the beginning of the acoustic waveguide. By applying a RF-drive signal at the interdigital transducer electrode an acoustic wave is excited. The acoustic wave travelling along the interaction length induces the mode coupling for the optical polarisation modes. To define a certain conversion band width, the interaction length L is limited by an acoustic absorber.

A fundamental condition for energy transfer is the phase matching between the polarisation modes which results from the solution of the coupled wave equations. A conversion efficiency of 100% can only be achieved if the phase difference between the two optical modes (TE- and TM-modes) with different effective refractive indices is continuously compensated, which means a completely synchronous interaction along the interaction length. This synchronous interaction is essentially caused by means of an acoustic "Bragg"-grating having a pre-determined period and inducing a coupling between the "TE"- and "TM"-mode. The coupling effect is described by the following equation:

$$\frac{2\pi n_{eff,TM}}{\lambda} - \frac{2\pi n_{eff,TM}}{\lambda} = \beta_{TM} - \beta_{TE} = \Delta\beta = \frac{2\pi}{\Lambda_{ac}} \quad (1)$$

Here $n_{eff,TM}$ and $n_{eff,TE}$ are the effective refractive indices for the (quasi) TE- and TM-modes, $\beta_{TM}$, $\beta_{TE}$ are the propagation constants for the wavelength $\lambda$ (in vacuum) and $\Lambda_{ac}$ is the wavelength of the acoustic ware (i.e. the periodicity of the perturbation of the dielectric censor induced for instance by a periodic electric field or a surface corrugation, i.e. the acoustic "Bragg"-grating Typically, the $\Lambda_{ac}$, is about 20–21 $\mu$m for $\lambda$=1530–1570 mm. The propagation constant (wavenumber Kac) is $$K_{ac} = \frac{2\pi}{\Lambda_{ac}} = \frac{2\pi f_{ac}}{v_{ac}} \quad (2)$$

where $\Lambda_{ac}$ is the acoustic wavelength, $f_{ac}$ is the frequency and $v_{ac}$ is the velocity of the acoustic wave. This is a phase matched (and thus wavelength dependent) process and a variation of the waveguide birefringence has a drastic effect on the phase matching and thus negatively influences the spectral conversion characteristics. The longer the waveguide is, the more detrimental the variations of birefringence on the phase matching is.

For optical wavelengths which do not fulfil the phase matching conditions the deviation $\delta$ from the ideal phase match condition can be expressed by the following equation:

$$\delta = \frac{1}{2}(\Delta\beta - K_{ac}) = \frac{\pi}{\lambda}\Delta n_{eff} - \frac{\pi f_{ac}}{v_{ac}} = \frac{\pi}{\lambda}\left(\Delta n_{eff} - \frac{\lambda}{\Lambda_{ac}}\right) \quad (3)$$

where $\Delta n_{eff}$ is the difference between the effective refractive indices of the guided polarisation modes. At a fixed acoustic frequency $f_{ac}$, the value $\delta$ is a function of the optical wavelength $\lambda$ and of $\Delta n_{eff}$. Only for $\delta$=0 a perfect phase matching exists and a complete energy transfer is possible. In a highly birefringent material as $LiNbO_3$ ($\Delta n_{eff}$≈0,072) the phase mismatch $\delta$ is a relatively strong function of the wavelength and hence $LiNbO_3$ is a good candidate to fabricate components with conversion characteristics of small bandwidths. However, variations in $n_{eff,TE}$, $n_{eff,TM}$ (i.e. $\Delta n_{eff}$) will influence whether or not a perfect phase matching can be achieved. The conversion efficiency $\eta$ in case of a phase matched interaction is given by:

$$\eta = \sin^2(\gamma\sqrt{P_{ac}}L) \quad (4)$$

where the factor $\gamma$ contains the material constants contributing to the coupling (elastooptic and piezoelectrical coefficient), $P_{ac}$ is the power of the acoustic wave and L is the length of the acousto-optical mode converter. It is seen that the conversion efficiency $\eta$ is, for the example of a constant coupling, approximately in the form of a (sin x/x)$^2$-type behaviour (acoustic directional couplers with weighted coupling may for example possess a Gaussian-type behaviour—therefore, the constant coupling only serves as one illustrative example here).

FIG. 4 shows a typical experimental result of measuring the conversion efficiency of a $LiNbO_3$ acousto-optical mode converter or the "constant coupling type" comprising a diffused waveguide of a width of 7.0 $\mu$m, a length of 60 mm and a height of 1250 Å (Å=10$^{-10}$ m). The values of width and height correspond to values before indiffusion. The graph in FIG. 4 shows many side lobes and does not very well resemble a (sin x/x)$^2$ function due to strong variations in the birefringence of the optical waveguide, FIG. 5 (relating to the same device as in FIG. 4) shows the phase matching frequency along an acousto-optic mode converter of 6 cm length for light of a wavelength of 1536 nm, The phase matching frequency and the effective birefringence are proportional to each other ($\Delta n_{eff}$=$\lambda \cdot f_{ac}/v_{ac}$; $v_{ac}$=3780 m/s for $LiNbO_3$ in the case of the above device), FIG. 5 illustrates that the type of optical waveguide used has a strong birefringence variation since the phase matching frequency alters along the longitudinal direction. Such experimental results can be obtained by using a pulse probing technique as is described in "Acoustic Pulse Measurements of Acousto-Optic Tunable Filter Properties" by L. B. Aronson, G. Ranken, T. R. Ranganath, D. W. Dolfi in [IPR19S, DANA POINT, post-deadline paper #6-2]. Therefore, in order to improve the performance of any integrated optic device that uses an acoustic-optical mode converter, such as an acousto-optic tunable 2×2 wavelength space switch (FIG. 6) or an integrated acousto-optical filter (FIG. 7), the aim is to make the conversion efficiency (shown in FIG. 4) to correspond as much as possible with the ideal curve. In the case of a constant coupling this means to make the conversion efficiency to correspond with the (sin x/x)$^2$-type behaviour. As disclosed in a parallel patent application filed by the applicant on the same day as the present application, this is achieved by having the birefringence of the optical waveguide varying as little as possible along the Optical Waveguide (FIG. 5).

The source of sidelobe asymmetry in integrated acousto-optic filters was studied in "Source of Sidelobe Asymmetry in Integrated Acousto-Optic Filters" by D. A. Smith, A. d'Alessandro, J. E. Baran and H. Herrmann, published in Applied Physics letters, vol. 62, pages 814–818 (1993). Here, the source of the asymmetry causing a cross-talk between wavelength-multiplexed optical channels is found to be influenced by the systematic even-order variation of the effective waveguide birefringence as a function of distance from the device center. Approximate simulations are presented that indicate what degree of non-uniformity of Ti-stripes thickness, width or diffusion temperature are responsible for such typical asymmetries. It is concluded that an intrinsic An variation is most likely due to a systematic longitudinal variation in device fabrication parameters, such as waveguide widths, layer thickness or diffusion temperature. It is also found that the sidelobe asymmetry may be caused from a systematic variation of the acoustic velocity profile. As remedies for sidelobe suppression it is suggested to impose a compensating structural bias on the optical waveguide widths leading to a cancellation of the beat-length non-uniformity.

S. Schmid, M. Sottocorno, A. Appleyard, S. Bosso report in "FULL WAFER SCALE FABRICATION OF ACOUSTO-OPTIC 2×2 WAVELENGTH SELECTIVE SPACE SWITCHES ON LiNbO$_3$", on pages 21–24 in the ECIO'95 proceedings (post-deadline papers) of the 7th European Conference on Integrated Optics, Apr. 3–6, 1995, Delft, The Netherlands, that optical waveguides for use in acousto-optic mode converters were manufactured using an indiffusion of an about 1000 Å thick and 7 μm wide titanium stripe at a temperature of 1030° C. for 9 h. For an acoustooptic mode converter a degradation of the band-reject characteristics is observed when light of both polarisations is launched into the device. This degradation is found to be due to small birefringence inhomogenities caused by fabrication tolerances resulting in a phase match frequency to vary between 25 and 50 kHz.

In "TAPERED ACOUSTICAL DIRECTIONAL COUPLERS FOR INTEGRATED ACOUSTO-OPTICAL MODE CONVERTERS WITH WEIGHTED COUPLING" by H. Herrmann, U. Rust and K. Sch@fer, IEEE Journal of Lightwave Technology, Vol. 13, Nr. 3, March 1995, pages 364–374, a polarisation independent integrated optical wavelength filter with a tapered acoustical directional coupler is discussed. The optical waveguides were fabricated by an indiffusion of 7 μm wide Ti-stripes during typically 9 h at 1030° C. It is reported that such waveguide parameters and manufacturing parameters yield a single mode optical waveguide for both TE and TM polarisations in the spectral range round λ=1.55 μm. The conversion characteristics of the mode converters disclosed here exhibit a slight asymmetry since the main side lobe on the left side of the main maximum is about 1.3 dB higher than that on the right side of the maximum, This asymmetry is here explained with the fact that the amplitudes of the even and odd surface acoustical wave modes are not exactly equal at the location of the optical waveguide. Here, the asymmetry is not attributed to a variation of the acoustic wave vector and therefore a variation of the phase matching condition along the device. It is here concluded that it should be possible to fabricate acousto-optical mode converters with a strong side lobe suppression, if the problems with the inhomogeneity can be handled, However, no design criteria are given for the optical waveguides to be used in the acousto-optical mode converters.

A summary paper of the fundamental physics and the working principle of acousto-optical tunable switches and filters is disclosed by S. Morasca, D. Scarano and S. Schmid "APPLICATION OF LiNbO3 ACOUSTO-OPTICAL TUNABLE SWITCHES AND FILTERS IN WDM TRANSMISSION NETWORKS AT HIGH BIT RATES", published in Giancarlo Prati (Ed.): "Photonics Networks", pp. 458 to 472, Springer, 1997. For an operating wavelength of around 1550 nm a straight mono-mode optical waveguide of typically 7 μm is embedded in about a 100 μm wide monomodal acoustic waveguide. Although it is discussed here, that the birefringent variations of the waveguide causes the phase mismatch, no design rules are indicated regarding the waveguide parameters and the fabrication parameters in order to have a small birefringence variation along the optical waveguide and a small dependency of the obtained birefringence with respect to a variation of the manufacturing parameters.

Acousto-Optic Devices Having an Improved Birefringence Variation

In the cited parallel application filed by the applicant on the same day as the present application a design rule is presented which allows to improve the birefringence variation along the waveguide (or respectively the variation of the birefringence between individual samples of waveguides on the same wafer). Essentially, this design rule particularly links the birefringence variation with the titanium stripe dimensions (before indiffusion). That is, the inventors have discovered that dimensional changes have different influence on a change of the birefringence depending on the size of the waveguide, In particular, it was found that the change in birefringence is larger for large (i.e. deep and wide) waveguides and small for small (i.e. shallow and thin) waveguides. This finding is best explained with reference to the acousto-optic mode converter since here the birefringence variation can easily be seen in terms of the conversion frequency, FIG. 8a shows the experimental conversion frequency f plotted over the width of the waveguide (before indiffusion!) for different types of the waveguides. In FIG. 6a a diffused waveguide was employed as in FIG. 1 (a). An interesting parameter in FIG. 8a is the change of the conversion frequency Δf over the change of depth (height) of the waveguide Δι, where ι designates the height of the channel waveguide (before diffusion). It is seen from FIG. 8 that a smaller width of the waveguide together with a smaller height of the waveguide results in smaller values of Δf/Δι. For example, whilst the ratio Δf/Δι for a 7 μm is 15 kHz/Å, this ratio is only 3.5 KHz/A for a 4.0 μm wide waveguide. On the right vertical scale, the birefringence values are indicated (i.e. the difference $\Delta n_{eff}$ between $n_{eff,TE}$ and neff, TM)—

In FIG. 8a, the line A designates the cut-off of the optical waveguide for a wavelength λ=1600 mm. That is, naturally, the smaller the waveguide becomes, the closer the fundamental mode of a certain wavelength will be to the cut-off condition. However, as is seen with the changing gradient of the curves near the cut-off boundary, the ratio Δf/Δι becomes smaller closer to the cut-off boundary. From this a general relationship can be derived, namely that for a given desired optical wavelength of propagation (and refractive index change between the waveguide and its surrounding medium), the propagation constant of the fundamental (and only) mode should be as close to out-off as possible.

This advantage of a reduction of the birefringent variation is also seen from FIG. 8b, which respectively show against the width of the waveguide W the variation of the conversion frequency Δf/Δw with respect to the change of width and the change of conversion frequency Δf/Δι with respect to a change of height, In FIG. 8b and FIG. 9 the variation Δf/Δw and Δf/Δι respectively becomes smaller, in absolute value, the smaller the waveguide widths w becomes. Furthermore, it is also seen that smaller heights of waveguides (e.g. T=1050 Å) lead to smaller absolute values of the changes Δf/Δw and Δf/Δι. The derivative of the conversion frequency with respect to the titanium layer thickness Δf/Δι. (FIG. 9) depends strongly from the waveguide width w. FIG. 9 also shows the values of −15 kHz/Å for a 7 μm wide waveguide (width before indiffusion) and −5 kHz/Å at 4 μm already indicated in FIG. 8a. That is, the waveguide in FIG. 9 is about 3-times less sensitive against inhomogenities (variations or changes due to the manufacturing method) of the titanium layer thickness.

As seen from FIG. 8b, on the other hand, waveguides with relatively small layer thickness (height) are less sensitive with respect to inhomogenities in the waveguide width. A simple estimation considering real process related differences indicates that a 4 μm wide waveguide hating a titanium layer thickness of 1050 Å is about 4- to 5-times less sensitive to typical fabrication tolerances than a conventional 7 μm wide waveguide having a titanium layer thickness of 1250 Å. The most preferable pair of layer height/waveguide width is 1250 Å/4.1 μm. Other preferable values are 1050 Å/5.2 μm and 1150 Å/4.5 μm.

FIGS. 10a, 10b are analogous to FIGS. 4, 5 (where Δf≈800 KHz corresponding to a birefringence variation along the waveguide of a value $\delta(\Delta n) \approx 3.3 \cdot 10^{-4}$) and show the superior effect of using a 1050 Å/4.5 μm waveguide in the acousto-optical mode converter. FIG. 10a shows that the side lobe suppression is superior (in fact very similar to the theoretical assumption) and FIG. 10b indicates that only very minor variations in the order of 100 KHz of the conversion frequency occur along the longitudinal direction of the acousto-optical mode converter. As explained before, the conversion frequency is essentially a measure of the birefringence variation and thus FIG. 10b shows that only a minor variation of the birefringence ($\delta(\Delta n) \approx 0.4 \cdot 10^{-4}$) occurs.

The inventors of the cited parallel application have clearly realised, that smaller waveguides (independent as to whether they are rib or channel waveguides etc.) perform better than strongly guiding wide waveguides. Since the conditions derived from FIGS. 8 to 11 i.e. "narrow" and "flat" waveguides, automatically means that the optical wave is not strongly guided, an optimisation (i.e. a minimisation) of the waveguide dimensions is limited by the "cut-off" wavelength of the fundamental modes. The "selection of waveguide dimensions (waveguide parameters)" such that the propagation constant is "close to cut-off" can be expressed with respect to the cut-off wavelength of the fundamental mode, If the components are operable in the wavelength window between 1530 nm and 1565 nm, then conventionally used waveguides in acousto-optical mode converters (having a width of 7–8 μm as can be taken from the above mentioned prior art documents) have a cut-off beyond 1750 nm for both TE- and TM—polarisations. According to the invention the expression "optimised waveguide parameters" means, that the lowest cut-off wavelength of the TM-mode or TE-mode is as close as possible to the upper signal wavelength, but preferably greater than 1570, and smaller than 1650. This is true for straight waveguides. Curved waveguides should be kept broader since the decrease of the cut-off wavelength due to the curvature must be compensated by a larger width (for example, if the straight waveguide has a width of 5.5 μm then a curved waveguide with Rc=130 mm should have a width of approximately 6.5 μm).

The most important realisation from the experiments in the parallel application is that the inventors have discovered that the performance of the acousto-optical devices are most strongly influenced by the waveguide dimensions. That is, whilst previously it had not been known which factors exactly influence the non-optimal behaviour of the conversion efficiency along the optical waveguide, the inventors have discovered that the problem lies within the waveguide dimensions.

Conventional List-Off Method

In the prior art the so-called "lift-off" method has been established as the method to use for making an indiffused channel waveguide, As for example described in Theodor Tamir (Ed.), "Guided-wave optoelectronics", Springer, 1990, pages 146 to 149, this method has been extensively studied in order to provide a set of manufacture conditions which are presently generally accepted as suitable for making indiffused channel waveguides that can be used in integrated optics. FIG. 11 shows the principle of the lift-off method.

A polished substrate 1 made e.g. from LiNbO$_3$ is cleaned and a photoresist 2 is deposited on the substrate 1 (FIG. 11a). The photoresist 2 is of a dual-tone-type and parts that are not exposed during the first exposition to UV-light are removed by a developer solution. A mask 3 with a desired waveguide pattern 4 is placed in contact with the photoresist 2 which is exposed to UV-light (FIG. 11a). A baking step of the photoresist 2 follows by heating the substrate to about 120° C. for approximately 210 s to cause a reversal of the photoresist characteristics. The photoresist is then exposed for a second time to UV-light, without the mask 3 (FIG. 11b), to cause a reversal of the photoresist characteristics so as to achieve a negative photoresist during the development process. As shown in FIG. 11c, upon developing to remove the exposed photoresist 2, a window corresponding to a waveguide pattern is left in the photoresist 2. As shown in FIG. 11d, a titanium layer 5 is deposited over the entire structure by RF-sputtering, electron beam deposition or a resistively heated evaporator. As seen in FIG. 11d, the titanium layer 5 is deposited on the disposed region of the substrate 1 and on the photoresist 2. The entire structure is then placed in a photoresist solvent which removes the photoresist and the unwanted titanium leaving the desired strip of titanium 5 on the substrate 1 as is shown in FIG. 11e. The process from FIG. 11d to FIG. 11e is called the "lift-off" step, The entire structure is then heated to indiffuse the titanium strip 5 into the substrate 1 to form the indiffused waveguide 6 as is shown in FIG. 11f.

U.S. Pat. No. 5,227,011 describes a method for producing a second harmonic wave generating device. It is stated that forming optical waveguides in LiNbO$_3$ by It diffusion is disadvantageous, since it is difficult to obtain great differences in refractive index from the bulk crystal. To produce a waveguide that is useable in such a non-linear device, a LiTaO3 layer is provided on a LiNbO$_3$ substrate and a LiNbO$_3$ waveguide layer is provided on the LiTaO3 layer. In order to provide a ridge waveguide (see FIG. 1e) the LiNbO$_3$ waveguide layer is dry etched to obtain the ridge geometry. Thus, a ridge having a large refractive index change is manufactured.

U.S. Pat. No. 4,851,079 describes lithium niobate waveguide structures, where an indiffused channel waveguide is provided in the lithium niobate substrate and where additional electrodes are deposited onto the surface of the substrate. The electrode structure comprises aluminium, gold on chromium, or gold on titanium. Using a dry etching method unmasked regions of the conducting layer provided on the surface of the substrate are etched to form the electrodes. No details about the indiffused channel waveguide in the substrate are given here.

Therefore, the prior art described so far only used the liftoff method for producing the channel waveguide as is generally described with reference to FIG. 11.

The inventors found, as is shown in FIG. 11c, that by usage of a dual tone photoresist 2, invariably an undercut or negative gradient occurs. This undercut cannot be controlled in a predictable way. The inventors further found that normally the titanium strip 5 is about 0.5 μm to 2 μm wider than expected (desired) on the chromium mask pattern 4. For example, if the pattern 4 has a width of 7 μm, then the actual strip width can be up to 8.5 μm in an unpredictable way. Furthermore, the applicant has found experimentally that the width of the waveguide can vary along the length of the waveguide by ±0.5 μm in an unpredictable way.

On the basis of the above experiments conducted in connection with the acousto-optic mode converter, where a waveguide dimension variation is found to contribute critically to the mode converter performance, and on the basis of the investigations made in connection with the lift-off method, where an unpredictability with respect to the waveguide width in particular was established, the inventors of the present application perceived a problem not known from the prior art, namely that the conventional lift-off method cannot provide waveguides with a good performance, i.e. for example a small birefringence variation along the waveguide. The applicant has established that this is mainly due to a large width variation of the titanium-stripe along the waveguide (and between several waveguide samples).

The above-described prior art shows that this problem with the conventional lift-off method had not been realised before.

In the patent abstracts of Japan, Vol. 011, No. 026 (P-539) & JP 61 196 106 A, a Ti film is vapor-deposited on the surface of an electrooptic substrate composed of $LiNbO_3$. An optical waveguide pattern is formed on the Ti film with a photoresist. The Ti film except a part forming the optical waveguide is removed by an ion etching technique such that a very thin residual Ti film is left on the surface of the electrooptic substrate at portions where no waveguide is to be formed in the substrate. Then, the remainder of the Ti film which is to be diffused is allowed to in fact diffuse into the electro-optical substrate. The extremely thin residual Ti film allows the formation of fine highly precise patterns by ionic etching and allows damage to the electro-optical substrate by ion collision to be minimized.

However, the thickness of the residual Ti film must be controlled precisely not to expose the surface of the substrate (since otherwise there is a damage of the substrate crystal) at the end of the etching process. Therefore, this type of etching process is a complicated, material-wasting- and time-consuming process.

SUMMARY OF THE INVENTION

Therefore, the problem of the invention is
to provide a method, a waveguide and integrated optics devices resulting to a high degree of accuracy, in particular in the width direction, when making indiffused optical waveguides, without requiring complicated manfacture steps.

This problem is solved by a method according to claim 1. Furthermore, this problem is solved by an indiffused optical waveguide according to claim 1. The problem is also solved by devices as mentioned in claims 8–15.

The inventors propose to use a chemical/physical etching technique. rather than the lift-off method or an ion etching in order to produce a refractive index raising-material stripe of a particular geometry on a substrate with much higher accuracy than known from the lift-off method. The combined chemical/physical etching technique has the advantage of providing for a reduced damaging effect of the substrate surface caused by the exposure of the substrate at the end of the etching process. Accordingly, the advantage is achieved that no precise control of the end of the etching process is necessary because—when using the chemical/physical etching techniques according to the invention—no substantial risk of damaging of the substrate surface exists when it does become exposed.

The method according to the invention is generally useable for making any kind of indiffused optical waveguide in a substrate. Thus, the method of the invention can be used for making any kind of integrated optics device having a much improved operability, in particular devices having a high sensitivity to waveguide profile variations, such as, e.g. an acousto-optical mode converter, an acousto-optical switch, an optical power splitter, a dual-output Mach-Zehnder modulator, a polarisation splitter and an electro-optical switch.

The chemical/physical etching techniques comprise downstream plasma reactor etching, an electroncyclotron resonance etching and a reactive ion etching technique. A preferred embodiment of the invention uses the reactive ion etching technique.

The reactive ion etching technique may be used for example in a $CF_4$, $SF_6$, $CHF_3$, $Cl_2$, or $SiCl_4$ atmosphere. A preferred embodiment of the invention uses a $SiCl_4$ gas atmosphere. Other preferred values for the manufacture conditions are a gas flow rate of 20 sccm and/or a pressure of 8 mTorr and/or a process power of 190 W and/or a RF generator frequency of 13.56 MHz and/or a bias voltage of 400 V and/or a process time of 225 s.

Furthermore, when the process gas is $SiCl_4$, a preferred value for the pressure is 4 to 300 mTorr and preferably about 8 mTorr.

According to the invention any substrate material or any waveguide material may be used. Preferably the substrate material is a birefringent material such as $LiNbO_3$. A preferred material for the metal layer is Ti.

A preferred embodiment of the waveguide geometry is a straight waveguide for example useable in an acousto-optical mode converter. However, the invention is not restricted to a particular geometry such that also a curved waveguide structure a branch or other shapes are within the scope of the invention.

The indiffused waveguide according to the invention is useable in any integrated optics device, such as, for example in an acousto-optical mode converter, an acousto-optical switch, an acousto-optical filter, an optical power splitter, a dualoutput Mach-Zehnder modulator, a polarisation splitter and an electro-optical switch. Also combinations of these devices on the same substrate can use the waveguide structure according to the invention.

Further advantageous embodiments and improvements of the invention may be taken from the dependent claims.

Hereinafter, the invention will be described with reference to its embodiments.

BRIEF DESCRIPTION OF THE DRAWINGS

In the drawings the same or similar reference numerals designate the same or similar parts throughout. In the drawings:

FIG. 4 shows the typical conversion characteristic of a conventional acousto-optical mode converter using an optical waveguide of 1250 Å height and 7.0 μm width and a length of 60 mm;

FIG. 5 shows a contour plot of the phase matching frequency (maximum=100% phase matching) along the acousto-optic mode converter of FIG. 4 indicating a typical birefringence variation along the longitudinal direction of the mode converter;

FIG. 7 shows the configuration of an acousto-optical filter;

FIG. 8a shows the dependency of the conversion frequency over the width of a waveguide together with the cut-off of the waveguide;

FIG. 9 shows the relative change of the conversion frequency Δf/Δt with respect to the layer thickness;

FIG. 10a shows the conversion efficiency η over the frequency using an inventive optical waveguide (length L=60 mm) in an acousto-optical mode converter;

FIG. 10b shows the variation of the phase matching frequency along the longitudinal direction of the acousto-optical device of FIG. 10a (center value = 100% phase matching);

PRINCIPLE OF THE INVENTION

Hereinafter, a method for manufacturing an indiffused optical waveguide structure in a substrate according to the invention is described with reference to FIG. 12.

Figure 12A:
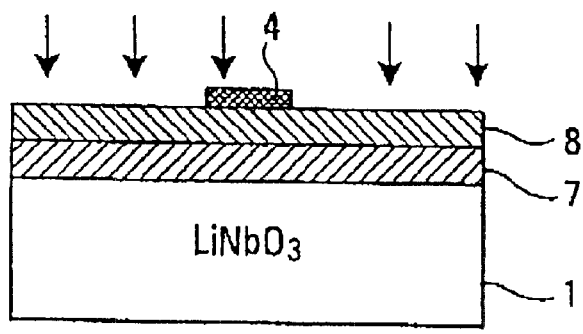
FIGS. 12a–12e shows a manufacturing method for making an indiffused waveguide according to a preferred embodiment of the invention.

In FIG. 12a a layer 7, of a material adapted to raise the refractive index by indiffusion in a substrate 1, e.g. a metal, preferably Ti or a non-metal, preferably titanium dioxide, is deposited on the surface of the substrate 1, preferably made of $LiNbO_3$. Hereinafter an example will be described using a metal layer 7, however the invention is equally applicable to any other material for the layer 7.

A standard positive photoresist film 8 is deposited on said metal layer 7. The positive photoresist film B is patterned to provide a mask pattern in accordance with the desired waveguide structure. As is shown in FIG. 12a using the waveguide masking pattern 4, the positive photoresist undergoes a photolithography process such that portions of the photoresist film 8 which have been exposed to light are removed (for example using a conventional wet etching technique). Then the mask pattern 4 is removed to result in the structure of FIG. 12b. The remaining photoresist pattern 8 on the metal layer 7 now corresponds to the desired waveguide structure to be made.

Figure 12B:
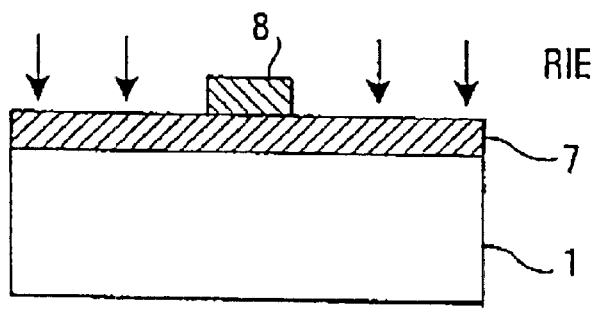

As is indicated with the arrows in FIG. 12b, the portions of the metal layer 7 not covered by the remaining photoresist mask pattern B is etched to expose the substrate surface 1. According to the invention a dry etching technique is used (in FIG. 12b a reactive ion etching technique RIE is indicated).

There are many dry etching technique for example known from the manufacturing of semiconductor devices. Dry etching techniques comprise an ion bombardment etching technique including sputter-etching and ion-milling etching techniques. Such ion bombardment techniques are physical etching techniques, i.e. the structure is removed by a physical impact.

However, according to the invention there are used combined chemical/physical etching techniques like a downstream plasma reactor etching, an electron-cyclotron resonance etching and a reactive ion etching as explained before. This has the major advantage that the possible damage to the substrate surface is reduced when it becomes exposed during the etching process.

When the chemical/physical etching technique comprises a reactive ion etching technique, a fluorine—or chlorine—based gas can be used as the processing gas such as, for example $CF_4$, $SF_6$, $CHF_3$, $Cl_2$ or $SiCl_4$.

When the processing is carried out in a SiCl4 gas atmosphere, preferred values for the processing conditions are as follows:

| | |
|---|---|
| Gas flow rate: | 20 sccm; |
| Pressure: | 8 mTorr; |
| Process power: | 190 W; |
| RF generator frequency: | 13.56 MHz; |
| Bias voltage: | 400 V; and |
| Process time: | 225 s. |

When the processing gas is $SiCl_4$, a preferred range for the pressure is 4 to 300 mTorr and preferably the pressure is 8 mTorr.

Figure 12C:
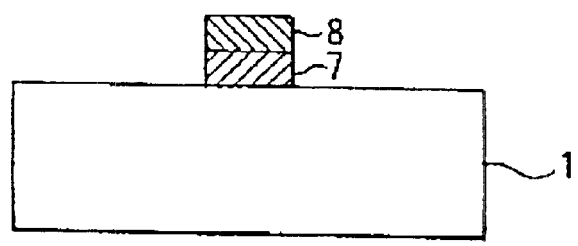
Figure 12D:
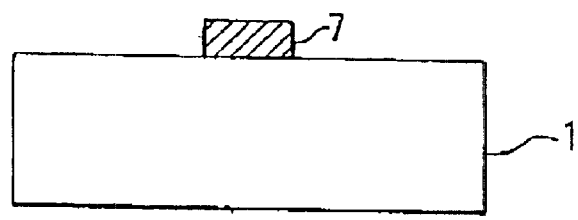
Figure 12E:
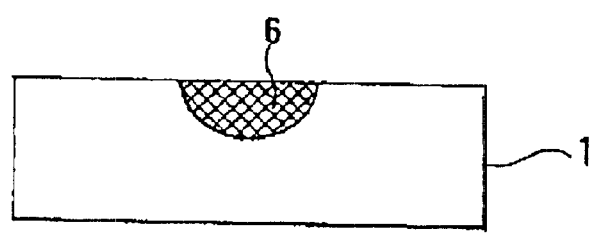

After the chemical/physical etching has been finished in FIG. 12b, the structure of FIG. 12c results, i.e. the chemical/physical etching is performed until the surface of the substrate 1 is exposed. Then the remaining resist 8 is removed to result in the structure of FIG. 12d. As in the conventional lift-off method, an indiffusion of the metal layer stripe 7 into the substrate 1 results in the indiffused channel waveguide 6 as is shown in FIG. 12e.

An indiffusion temperature may be in the range of 1000° C. to 1050° C. A predetermined diffusion time for the diffusion process may be 9 hours.

The above-described method is not limited to any particular waveguide and substrate or resist material. That is, the substrate material may be a birefringent material such as $LiNbO_3$ and the metal layer material may be titanium or any other metal. of course, the final waveguide structure in terms of the geometry depends on the mask pattern 4 used in FIG. 12a. Therefore, the method is not limited to only straight waveguides but any kind of geometry, for example curved waveguides may be manufactured. Furthermore, it should be noted that the method is also not limited to manufacture waveguides of the uniform width. That is, to fulfil predetermined conditions when the waveguides are bent, it is also conceivable to have a first waveguide width in a straight section and a second gradually varying waveguide width in a bent section, The waveguide width are prescribed by the mask pattern only.

Figure 1:
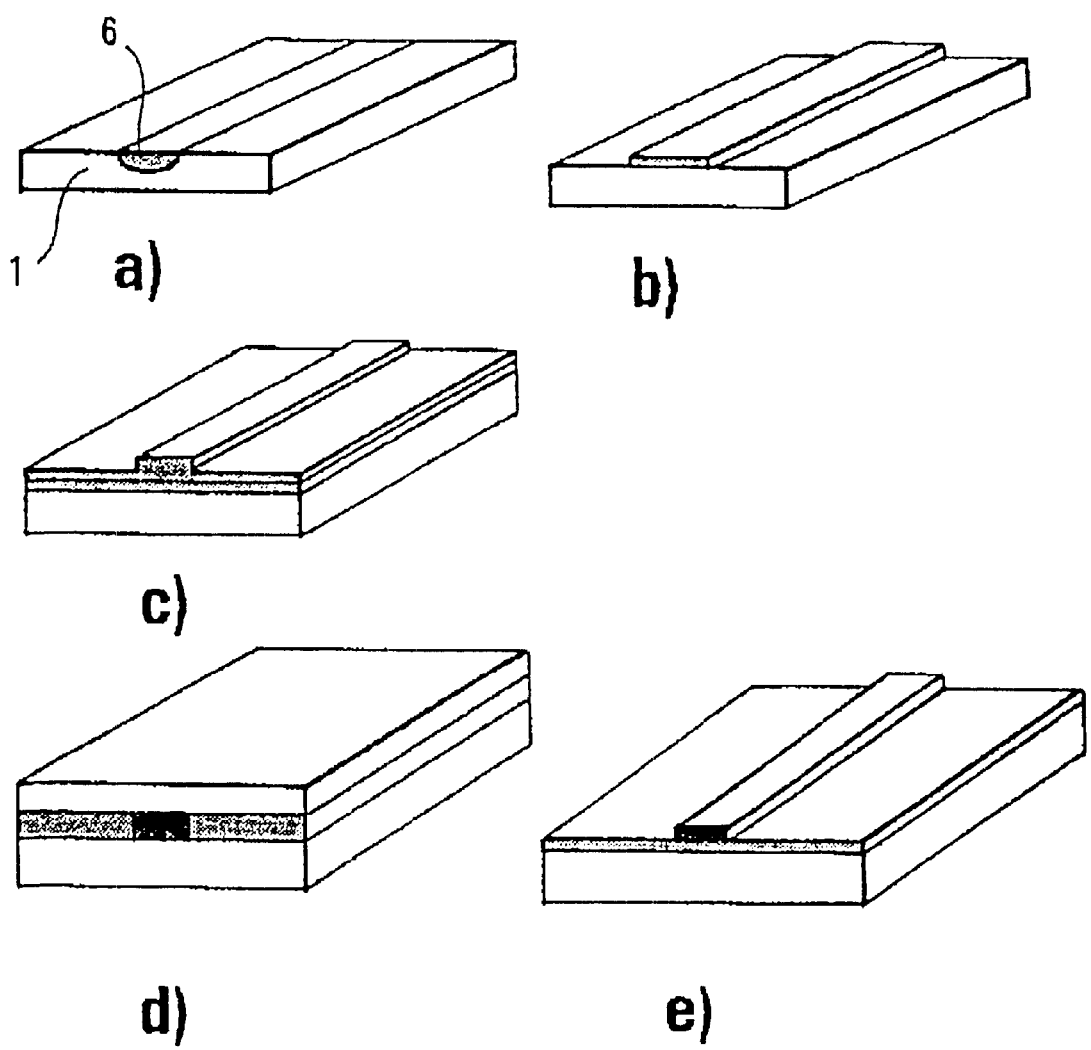
FIG. 1 shows typical waveguide structures in integrated optical technology to which the invention is applicable.
Figure 2:
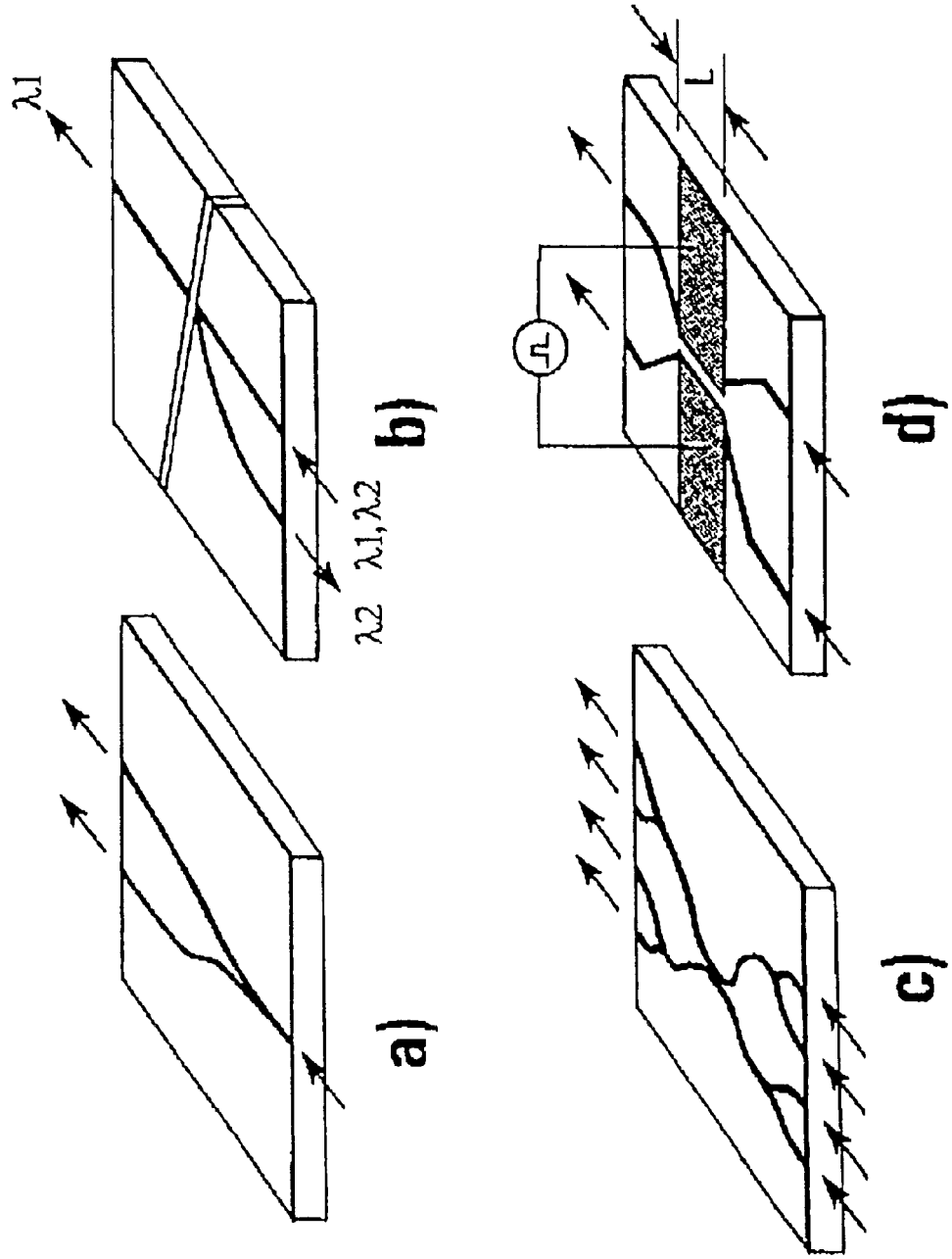
FIG. 2 shows conceptional diagrams of some integrated optical components which can be built using the waveguide structures of FIG. 1.
Figure 3:
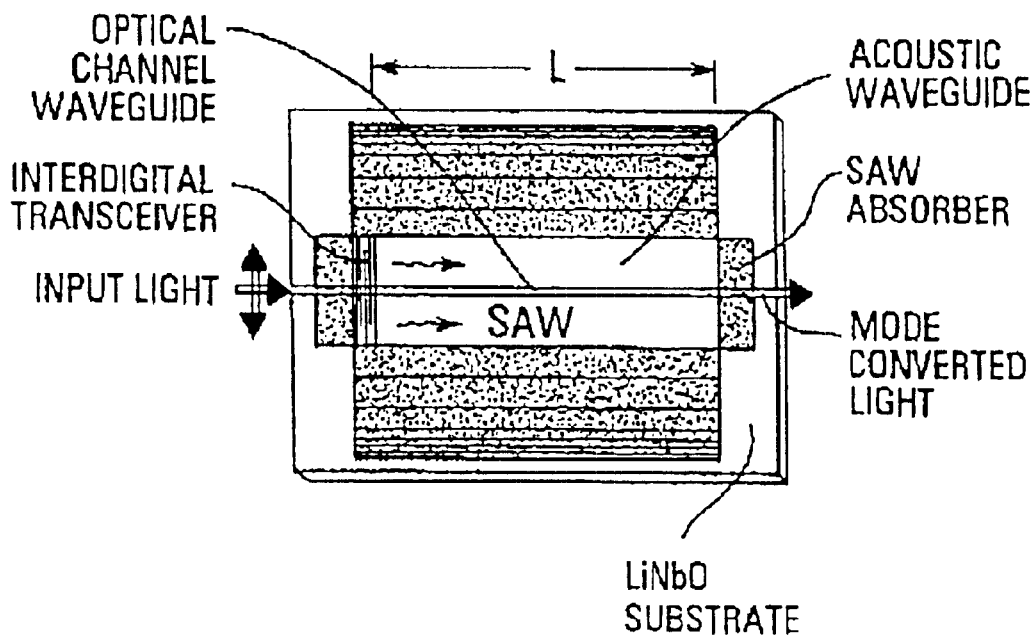
FIG. 3 shows a basic mode converter design.
Figure 6:
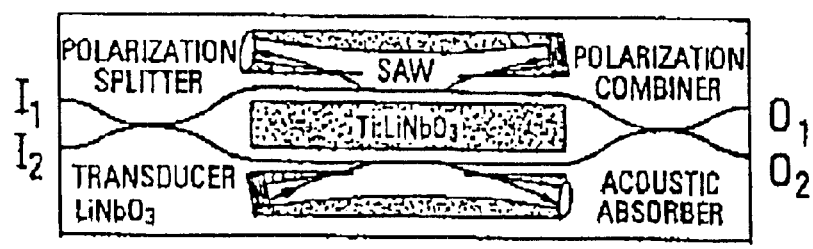
FIG. 6 shows an acousto-optic tunable 2×2 wavelength space switch using a polarisation beam splitter and a polarisation combiner at the input and output.
Figure 8B:
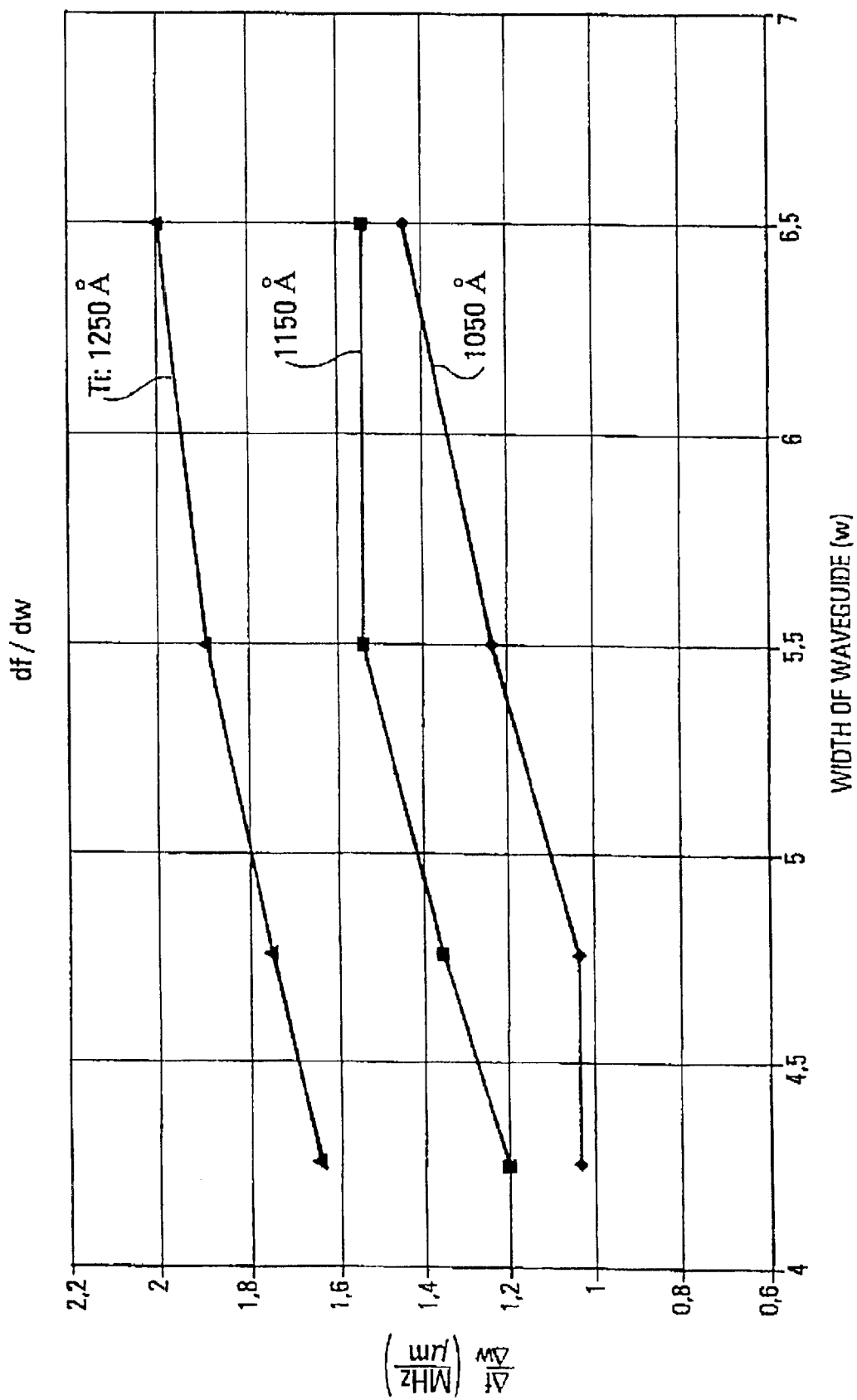
FIG. 8b shows the relative change of conversion frequency Δf/Δw with respect to the width of the waveguide.

It is important to note that the method in FIG. 12 can obtain a metal stripe on the substrate 1 before indiffusion which has a width which corresponds to the desired value in a highly reproducible manner and very accurately. Therefore, if for example the waveguide widths are chosen as shown in FIGS. 8a, 8b, 9, then the stripe obtained with the method according to the invention corresponds to the desired dimensions very accurately. As the width is the most critical parameter, improvement in the width accuracy and reproducibility is of great importance in practical devices, such as the above-described acousto-optical mode converter.

Of course, it should be noted that the manufacturing method in FIG. 12 is generally applicable to the formation of any indiffused optical waveguide and that the invention is therefore not restricted to the particular substrate material, waveguide geometry or integrated optics or a acousto-optical device. The manufacturing method in FIG. 13 is advantageous for the formation of any kind of waveguide geometry and device needing very precisely controlled stripe width dimensions before the indiffusion.

Figure 13:
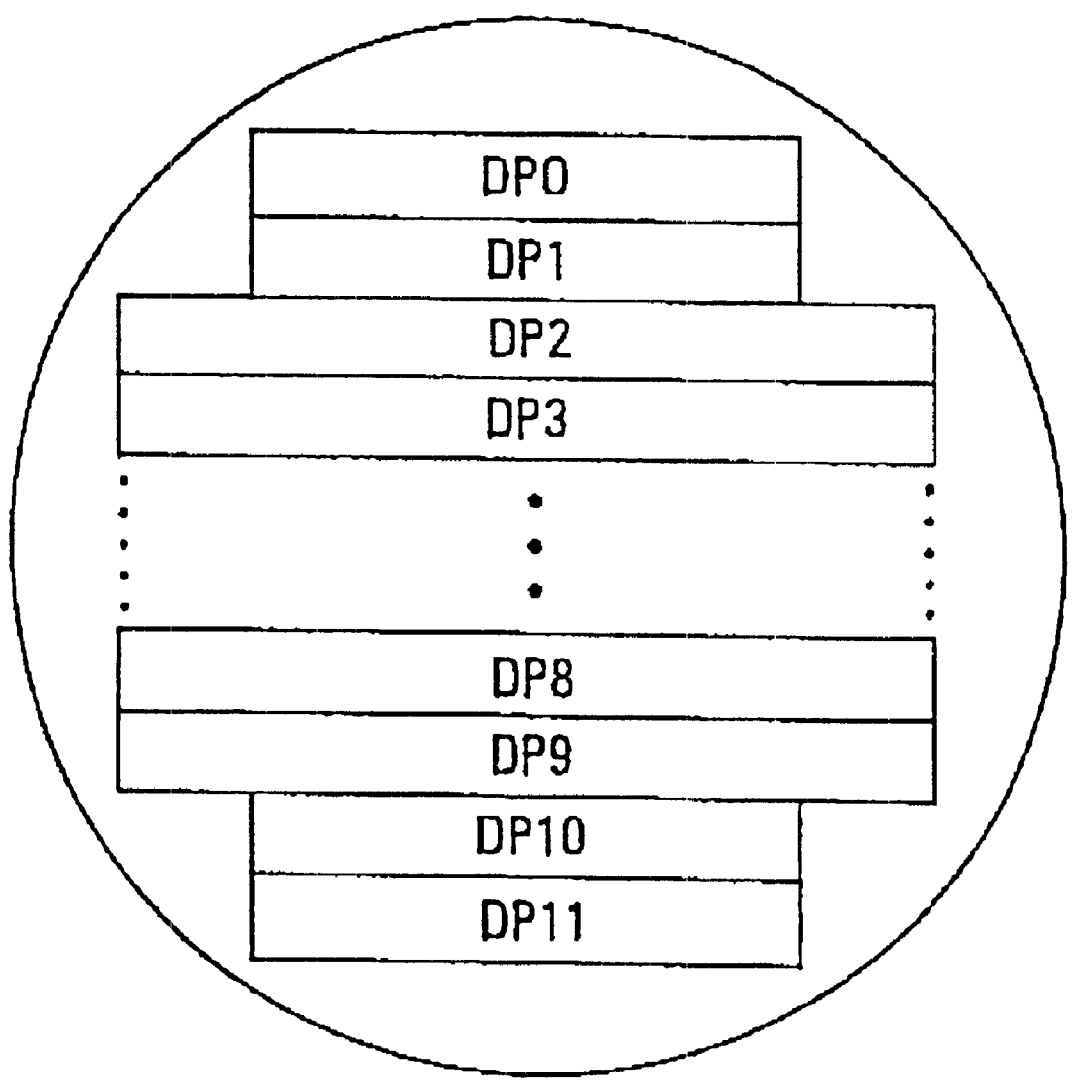
FIG. 13 shows examples of a wafer with several samples DP0–DP11 of optical waveguides according to the invention.
Figure 14:
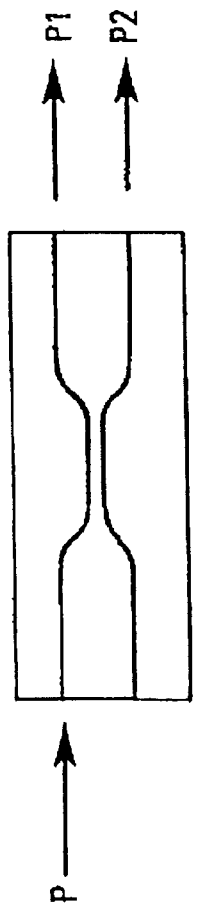
FIG. 14 shows a table comparing the performance of the lift-off method with the method according to the invention.

FIG. 13 shows a wafer with a number of samples DP0, DP11, each containing a number n of samples including an indiffused optical waveguide made according to the method of the invention. In the example in FIG. 13, n=50 and the integrated optics device is a power splitter as shown in FIG. 14, That is, each section DP0, ..., DP11 contains a number n of power splatters. Several samples were prepared by the conventional lift-off method and by the method according to the invention using a dry etching technique. In FIG. 13, FIG. 14, a reactive ion etching technique was used for the dry etching. In each of the samples GP0, ..., DP11 the titanium thickness before indiffusion was changed resulting in the change of mode diameter.

As shown in the schematic drawing in FIG. 14, the power splitter obtained in each sample DP0, ..., DP11 was analysed by inputting light of a particular input power P and by measuring respectively the output powers P1, P2 at the output ports. The splitting ratio P1/P2 for the power splitters of each sample depends from the thickness of the Ti-layer before indiffusion. Furthermore, it has been shown by experiments done by the applicant that the splitting ratio P1/P2 may vary from sample to sample and among power splitters in each sample, due to random process variations. The average of the splitting ratio P1/P2 for the n power splitters in each sample is given in the table. Furthermore, the standard deviation (%) and the maximum variation (%) is calculated.

Samples DP0, DP1, DP3, DPS, DP6, DP7, DP8, DP10, DP11 were made with the lift-off method. For these samples also the average percent standard deviation and the maximum percent variation was calculated.

Another wafer was manufactured with samples DP12, DP13, DP14 where a number of power splatters were manufactured using the method according to the invention. A reactive ion etching method was used for the chemical/physical etching. The same parameters as for the conventional lift-off method were calculated, i.e. the average splitting ratio P1/P2, the percent standard deviation and the maximum percent variation. Furthermore, also the average of the standard deviation was calculated.

From the table in FIG. 14 it is clearly seen that there is a much larger variation of the splitting ratio when using the conventional lift-off method. Comparing the standard deviation of 10.51% for the lift-off method with the average standard deviation of 3.73% of the inventive method, it is seem that the inventive method produces an average standard deviation which is a factor 3 smaller than the conventional lift-off method. The applicant has determined that the accuracy and predictability of waveguides achieved by a chemical/physical etching technique according to the invention is within ±0.1 µm. Furthermore, the maximum variation is around 11% for each sample prepared with the reactive ion etching technique, whereas the maximum variation changes from about 13% to about 66% among samples prepared with the lift-off method. This significant improvement in the performance was totally unexpected.

Thus, the inventors first realised that the change in waveguide geometry is responsible or a change in operation performance (i.e. as is indicated in FIG. 8a for the acoustooptic mode converter) and performed experiments using the conventional lift-off method for varying metal layer thicknesses in order to find out whether this is a problem with this conventional method which had previously been generally accepted as the method to use. Rather than attributing the large average standard deviation obtained in the experiments to specific choices of manufacture conditions in the lift-off method, the inventors realised that the problem is within the lift-off method itself.

After performing the experiments using the RIE method, such waveguide width variations could be reduced and this resulted in the considerably lower average value of the standard deviation.

There is also a physical explanation why this problem of width variation occurs in the lift-off method. The shape of the undercut before deposing the titanium layer is irregular, due to the double exposure of the dual-tone photoresist. Then, as is shown in FIGS. 11c, 11d, due to the undercuts produced when developing the structure, solvent intrudes the regions next to the stripe and causes the width variation. It was unexpected that this step in the conventional lift-off method indeed produced waveguide width variations to such an extent that they would influence the operation performance of the optical waveguide drastically.

Figure 11A:
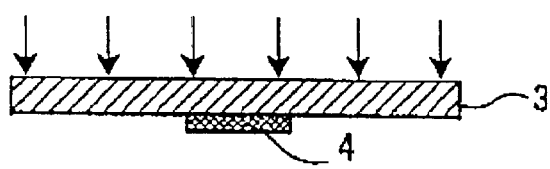
FIGS. 11a–11e shows a conventional "lift-off" manufacturing method for making an indiffused waveguide.
Figure 11B:
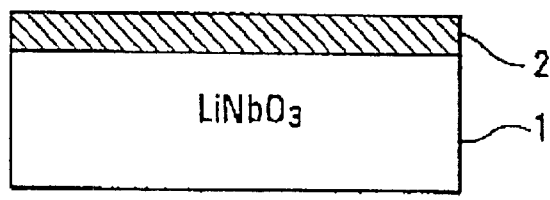
Figure 11C:
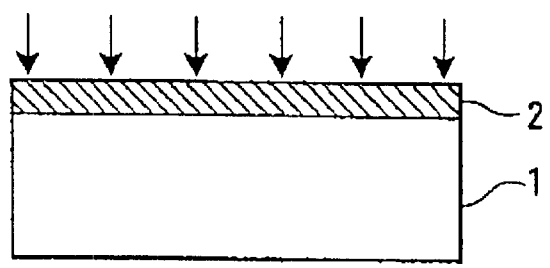
Figure 11D:
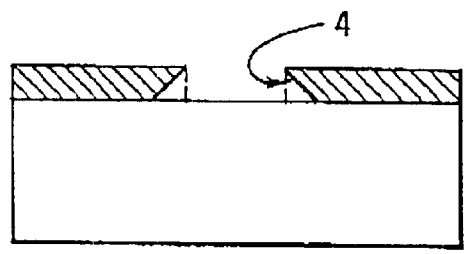
Figure 11E:
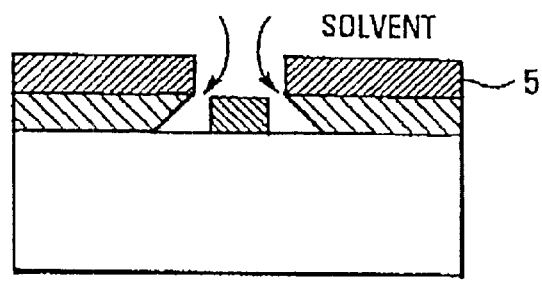

By contrast, the chemical/physical etching technique does not use such sequential steps as in FIGS. 11b, 11c in order to remove the titanium layer above the resist, such that the titanium layer already provided on the substrate can be etched very highly and accurately. Thus, the width variation along one waveguide or between waveguides of the same sample can be kept small. Since the width variation is improved the performance of the optical waveguide itself (i.e. transmission and coupling characteristics) can be improved and thus any integrated optics or acousto-optic device using such a diffused channel waveguide according to the invention has much improved operation characteristics.

Typical devices where such optical waveguides according to the invention may be used are an acousto-optical mode converter (as described above), an acousto-optical switch, an accusto-optical filter, an optical power splitter, a dualoutput Mach-Zehnder modulator, a polarisation splatter or an electro-optical switch.

Figure 16A:
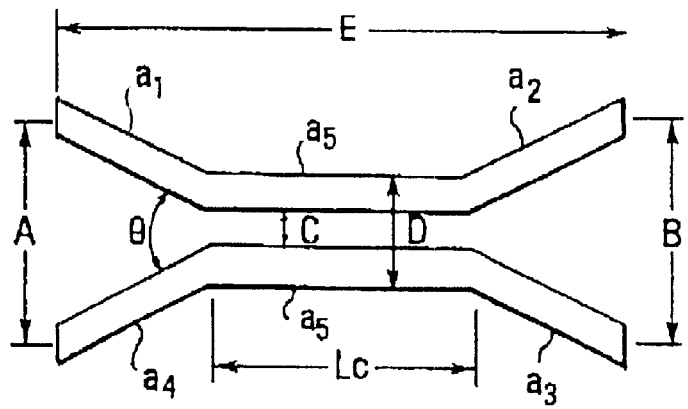
FIG. 16a shows an evanescent-wave polarisation splitter using an indiffused optical waveguide according to the invention.

Two devices of particular importance will be described with reference to FIG. 16. FIG. 16a shows the principle of an evanescent wave coupler on a lithium niobate substrate to make a polarisation splitter as used in the example of FIGS. 13, 14. Such a polarisation splitter consists of single mode waveguides $a_1$, $a_2$, $a_3$, $a_4$ having an overall length of E and spacings A, B. The waveguides have a particular separation angle θ. A coupling region is denoted with Lc. In this coupling region the resonant evanescent fields of the progating modes respectively excite a mode in the adjacent portion according to the polarisation of the incoming light. Light of the TE/TM polarisation in the birefringent material will have different coupling properties, such that one polarisation will be output at the output waveguide $a_2$ and the other polarisation will be output at the waveguide $a_3$. For a so-called zero-gap-coupler, the distance C=0. Example data for such a polarization splitter is; C=0 µm, D=14 µm, E=5 mm and θ=0.55 grad. The application of such a polarisation splitter to an acousto-optical waveguide device is disclosed in EP 0 737 880 A1.

Figure 16B:
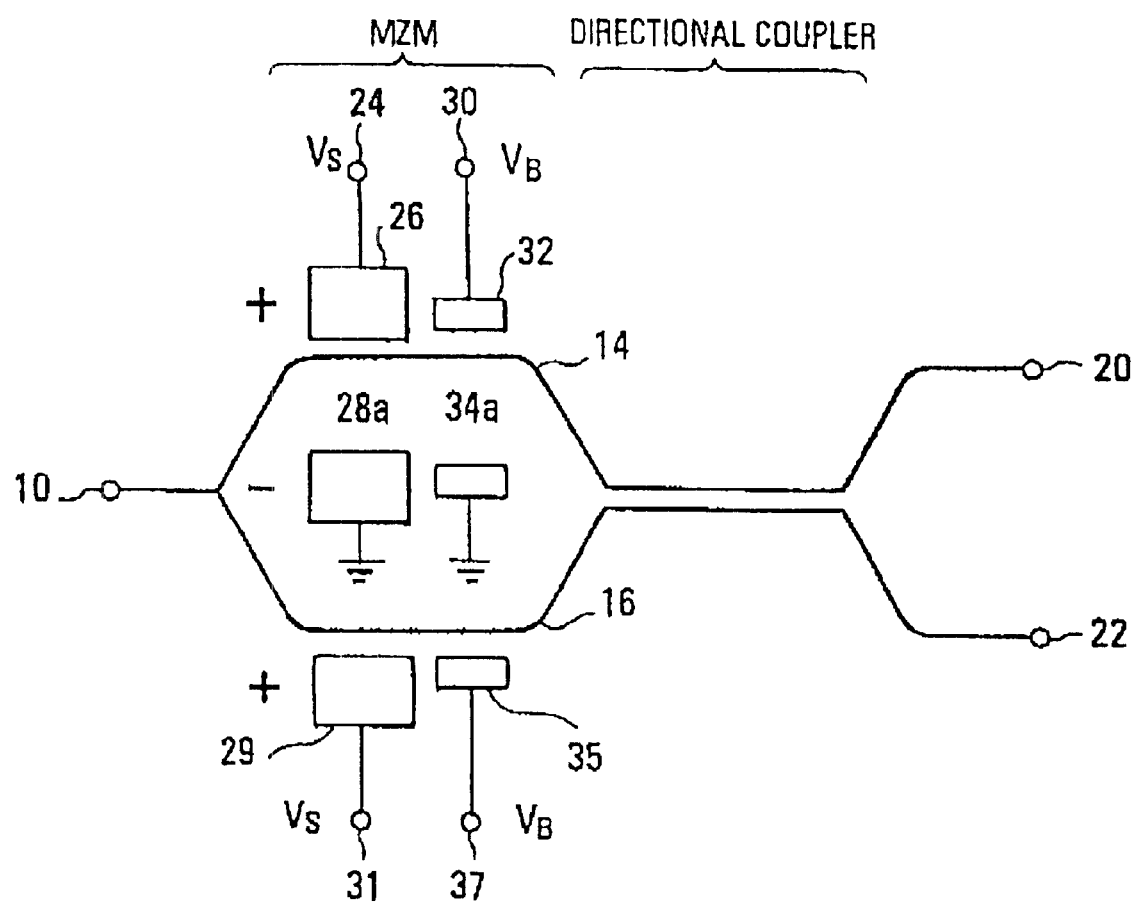
FIG. 16b shows a dual-output Mach-Zehnder modulator comprising a Mach-Zehnder modulator and a directional coupler.

Another important device where the optical waveguide made according to the method of the invention is particularly useful is a dual-output Mach-Zehnder modulator (interferometer) as shown in FIG. 16b. Such a device is described in U.S. Pat. No. 5,119,447. A Mach-Zehnder modulator MZM is followed by a directional coupler. The Mach-Zehnder modulator is modulated with a first pair of electrodes 26, 28a, 29 when respective voltages $V^S$ are applied to the terminals 24, 31. Separate DC bias electrodes 32, 34a, 35a receiving a bias voltage $V_B$ at the terminals 30, 37 can additionally be provided, Reference numerals 14, 16 denote diffused optical waveguides in a substrate made of $LiNbO_3$ according to the invention. The Mach-Zehnder modulator including the succeeding directional coupler allows to split energy input at the terminal 10 equally at the terminals 20, 22.

However, it should be understood that the invention is not restricted to any particular integrated optics device or any particular acousto-optic device as shown here.

Figure 15A:
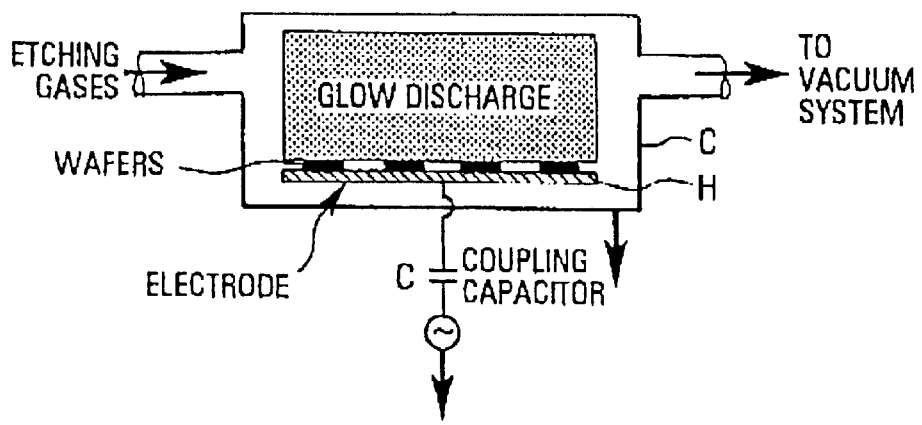
FIG. 15a shows an apparatus for carrying out the method of the invention when a reactive ion etching technique is used for the chemical/physical etching.
Figure 15B:
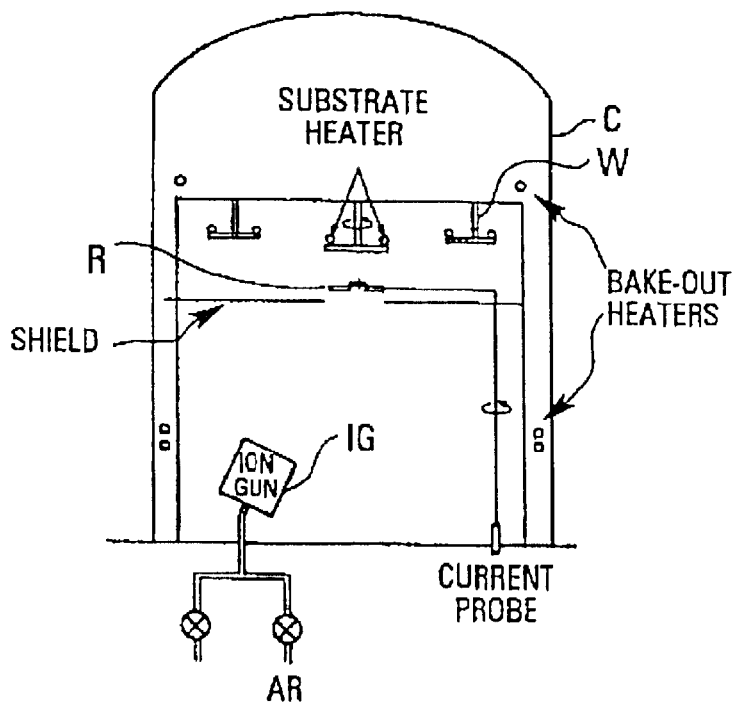
FIG. 15b shows an apparatus for an ion-milling-technique.
Figure 15C:
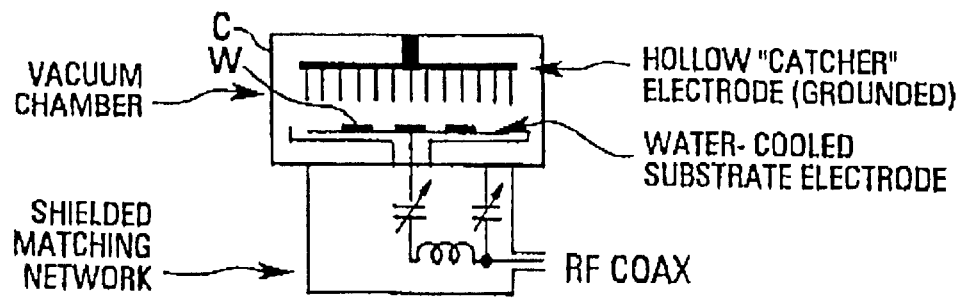
FIG. 15c shows an apparatus for the sputter-etch-technique.

FIGS. 15a, 15b, 15c show several etching devices and e.g. FIG. 15a can be used for carrying out the invention. FIG. 15a shows a conventional reactive ion etching apparatus. Etching gases are supplied to the chamber C and the wafers are provided on a common holding device H. A glow discharge is generated in the chamber C and a bias voltage is applied to the electrode H. Thus, the ions contained in the glow discharge are accelerated towards the wafers and thus etch the exposed titanium portions (see the method in FIGS. 12b, 12c).

FIG. 15b shows a so-called sputter-etching apparatus. An ion gun IG generates an ion beam which is directed to a target material contained in a receptacle R. The wafers are heated by a substrate heater and the particles removed from the target are sputtered onto the water.

FIG. 15c shows the so-called ion-milling technique where the substrates are provided on a water-cooled substrate electrode within a vacuum chamber. A hollow so-called "catcher" electrode (which is connected to ground) is arranged opposite to said substrate electrode. When an RF energy is applied to the electrodes gas ions contained in the vacuum chamber perform a kind of grinding operation on the wafers, Thus, the exposed metal layer (titanium) portions can be removed.

INDUSTRIAL APPLICABILITY

As explained above, the method of the invention can be used for fabricating an improved indiffused optical waveguide wherein the use of this waveguide is not restricted to any kind of particular device. A particular advantageous use of such indiffused optical waveguides according to the invention is within an acousto-optical mode converter, since here even small variations in the width cause a drastic variation of the birefringence along the optical waveguide.

The invention is not limited to the above-described embodiments, which are currently perceived as the best mode of the invention and which only serve the general explanation of the principle of the invention. Within the scope of the invention, as defined in the appended claims, the invention can also he realised with other embodiments which have not been described above. In particular, the invention can comprise features, which result from a combination of the respective single features of the claims. Reference numerals in the claims, in the description and in the drawings only serve illustration purposes to facilitate the understanding of the invention and do not limit the scope of protection.

What is claimed is:

1. An indiffused optical waveguide in a flat substrate formed by etching a metal layer deposited on a surface of said flat substrate and covered with a resist layer mask pattern, wherein the etching is performed by a combined chemical and physical etching technique to expose the substrate and by diffusing the remaining metal layer structure on the surface of said flat substrate into the substrate by a heat treatment such that a uniform waveguide having substantially uniform birefringence is produced.

2. A waveguide according to claim 1, wherein said chemical/physical etching technique used for etching and metal layer comprises downstream plasma reactor etching, electron-cyclotron resonance etching or reactive ion etching technique (RIB).

3. A waveguide according to claim 1, wherein said chemical/physical etching technique used for etching a metal layer comprises a reactive ion etching technique in an atmosphere comprising $CF_4$, $SF_6$, $CHF_3$, $Cl_2$, or $SiCl_4$.

4. A waveguide according to claim 1, wherein said substrate material is a birefringent material.

5. A waveguide according to claim 1, wherein said substrate material is $LiNbO_3$.

6. A waveguide according to claim 1, wherein said metal layer material is Ti.

7. A waveguide according to claim 1, wherein said waveguide structure is a straight or curved waveguide.

8. An integrated optics device comprising one or more indiffused optical waveguides according to anyone of claims 1–7.

9. An acousto-optical mode converter comprising one or more indiffused optical waveguides according to anyone of claims 1–7.

10. An acousto-optical switch comprising one or more indiffused optical waveguides according to anyone of claims 1–7.

11. An acousto-optical filter comprising one or more indiffused optical waveguides according to anyone of claims 1–7.

12. An optical power splitter comprising one or more indiffused optical waveguides according to anyone of claims 1–7.

13. A dual-output Mach-Zehnder modulator comprising one or more indiffused optical waveguides according to anyone of claims 1–7.

14. A polarisation splitter comprising one or wore indiffused optical waveguides according to anyone of claims 1–7.

15. An electro-optical switch comprising one or more indiffused optical waveguides according to anyone of claims 1–7.

16. A waveguide according to claim 1, M wherein the uniform birefringence results from controlling dimensions of the metal layer that remains alter etching.

* * * * *